US008761927B2

(12) United States Patent
Johnson et al.

(10) Patent No.: US 8,761,927 B2
(45) Date of Patent: Jun. 24, 2014

(54) EXTERNALLY ACTUATED FIGURE

(75) Inventors: Steven A. Johnson, Stevenson Ranch, CA (US); Akhil Jiten Madhani, Pasadena, CA (US); Joel F. Jensen, Redwood City, CA (US); Daniel R. Bauen, Atlanta, GA (US); Troy A. Carter, Sunnyvale, CA (US); Cassilyn Bair, Atlanta, GA (US)

(73) Assignee: Disney Enterprises, Inc., Burbank, CA (US)

( * ) Notice: Subject to any disclaimer, the term of this patent is extended or adjusted under 35 U.S.C. 154(b) by 858 days.

(21) Appl. No.: 12/971,995

(22) Filed: Dec. 17, 2010

(65) Prior Publication Data

US 2012/0152051 A1    Jun. 21, 2012

(51) Int. Cl.
*G06F 19/00* (2011.01)
*B25J 17/02* (2006.01)

(52) U.S. Cl.
CPC ............ *B25J 17/0266* (2013.01); *Y10S 901/15* (2013.01); *Y10S 901/23* (2013.01); *Y10S 901/28* (2013.01)
USPC ..................... 700/245; 74/490.01; 74/490.05; 901/15; 901/23; 901/28

(58) Field of Classification Search
CPC ............. B25J 17/0266; B23Q 1/5462; A61B 19/2203; A61B 2019/2242; B22D 46/00
USPC ............ 700/245; 74/490.01, 490.05; 901/15, 901/23, 28
See application file for complete search history.

(56) References Cited

U.S. PATENT DOCUMENTS

| 3,391,485 A | 7/1968 | Fosser |
| 3,672,092 A | 6/1972 | Tepper et al. |
| 3,874,112 A | 4/1975 | Sapkus et al. |
| 3,928,932 A | 12/1975 | Maurer |
| 4,459,898 A | 7/1984 | Harjar et al. |
| 4,499,784 A | 2/1985 | Shum |

(Continued)

FOREIGN PATENT DOCUMENTS

EP    0238307 A2    9/1987

OTHER PUBLICATIONS

Hwang et al., Design of SPDM Like Robotic Manipulator System for Space Station on Orbit Repaceable Unit Ground Testing and Overview of the System Architecture, 1994, IEEE, p. 1266-12-91.*

(Continued)

*Primary Examiner* — McDieunel Marc
(74) *Attorney, Agent, or Firm* — Marsh Fischmann & Breyfogle, LLP; Kent A. Lembke

(57) ABSTRACT

A system for externally actuating an animatronic figure. The system including a first robotic mechanism configured as a remote center mechanism for rotating a first rod about a first remote center point. The first rod is attached to a first driven part of the figure with the first remote center point spaced apart from the figure. The system includes a second robotic mechanism rotating a second rod about a second remote center point. The second rod is attached to the second driven part of the animatronic figure, and the second remote center point is spaced apart from the animatronic figure. The system includes a third robotic mechanism rotating a third rod about a remote center point, with the third rod attached to a third driven part of the figure, and the three robotic mechanisms are concurrently operable via a computer-based controller to provide the figure with twenty-one degrees of freedom.

26 Claims, 33 Drawing Sheets

(56) References Cited

U.S. PATENT DOCUMENTS

| | | | |
|---|---|---|---|
| 4,684,312 A | 8/1987 | Antoszewski et al. | |
| 4,686,866 A | 8/1987 | Rosheim | |
| 4,780,047 A | 10/1988 | Holt et al. | |
| 4,804,220 A | 2/1989 | Rosheim | |
| 4,819,496 A * | 4/1989 | Shelef | 74/490.03 |
| 4,874,998 A | 10/1989 | Hollis, Jr. | |
| 4,995,610 A | 2/1991 | Paoletti | |
| 5,182,557 A | 1/1993 | Lang | |
| 5,263,382 A | 11/1993 | Brooks et al. | |
| 5,270,480 A | 12/1993 | Hikawa | |
| 5,393,058 A | 2/1995 | Rowland et al. | |
| 5,528,955 A | 6/1996 | Hannaford et al. | |
| 5,792,135 A | 8/1998 | Madhani et al. | |
| 5,797,900 A | 8/1998 | Madhani et al. | |
| 5,807,377 A | 9/1998 | Madhani et al. | |
| 5,870,842 A | 2/1999 | Ogden et al. | |
| 5,966,853 A | 10/1999 | Yeh | |
| 5,976,122 A | 11/1999 | Madhani et al. | |
| 6,357,152 B1 | 3/2002 | Brooks et al. | |
| 6,371,952 B1 | 4/2002 | Madhani et al. | |
| 6,413,264 B1 | 7/2002 | Jensen et al. | |
| 6,516,681 B1 * | 2/2003 | Pierrot et al. | 74/490.01 |
| 6,587,750 B2 | 7/2003 | Gerbi et al. | |
| 6,684,129 B2 | 1/2004 | Salisbury, Jr. et al. | |
| 6,714,839 B2 | 3/2004 | Salisbury, Jr. et al. | |
| 6,786,896 B1 | 9/2004 | Madhani et al. | |
| 6,991,627 B2 | 1/2006 | Madhani et al. | |
| 7,011,489 B2 * | 3/2006 | Brogardh et al. | 414/735 |
| 7,217,171 B2 | 5/2007 | Hsu | |
| 7,238,079 B2 | 7/2007 | Madhani et al. | |
| 7,316,681 B2 | 1/2008 | Madhani et al. | |
| 7,628,093 B2 | 12/2009 | Madhani et al. | |
| 7,637,710 B2 * | 12/2009 | Skutberg et al. | 414/735 |
| 7,719,222 B2 * | 5/2010 | Theobald | 318/568.12 |
| 7,780,651 B2 | 8/2010 | Madhani et al. | |
| 7,819,719 B2 | 10/2010 | Tye et al. | |
| 8,106,616 B1 * | 1/2012 | Theobald | 318/568.2 |
| 2004/0103739 A1 * | 6/2004 | Brogardh et al. | 74/490.01 |
| 2005/0043718 A1 | 2/2005 | Madhani et al. | |
| 2007/0190894 A1 | 8/2007 | Grisoff | |
| 2008/0216596 A1 | 9/2008 | Madhani et al. | |
| 2009/0221210 A1 | 9/2009 | Lin | |
| 2009/0326677 A1 | 12/2009 | Phillips et al. | |
| 2013/0074637 A1 * | 3/2013 | Choi et al. | 74/490.05 |
| 2014/0020500 A1 * | 1/2014 | Briot et al. | 74/490.05 |

OTHER PUBLICATIONS

Wavering, Parallel Kinematic Machine Research at NIST Past, Present, and Future, 1998, Internet p. 1-13.*

Bu et al., Nonlinear Model Based Coordinated Adaptive Robust Control of Electro-hydraulic Robotic Arms via Overparametrizing Method, 2001, IEEE,p. 3459-3464.*

Stankóczi, Development of a New Parallel Kinematics Machine Tool, 1999, Internet, p. 1-8.*

Hunter, The Space Station Freedom Special Purpose Dexterous Manipulator (SPDM), 1991, IEEE, p. 1-6.*

Munoz, Victor F., et al., "Design and control of a robotic assistant for laparoscopic surgery," retrieved from http://www2.laas.fr/sirs2001/proceedings/30-V.F.Munoz.pdf, Instituto de Automatica y Robotica Avanzada de Andalucia, Jul. 18-20, 2001.

Chen, I-Ming, et al., "Marionette: from Traditional Manipulation to Robotic Manipulation," http://mrl.nyu.edu/~perlin/courses/spring2006/class-0424/04-c-hmm-puppet-d%5B1%5D.pdf, Apr. 1, 2008, School of Mechanical and Production Engineering Nanyang Technological University.

Keller, Joseph, "Harry the Hitcher" http://www.hauntproject.com; Apr. 8, 2007, retrieved from the Internet Jan. 20, 2011.

Halloween Propmaster, "Prop Head Movement" http://www.hauntproject.com/projdetail.asp?category-Animatronic%20Props, Apr. 11, 2008; retrieved on the Internet Jan. 20, 2011.

\* cited by examiner

EXTERNALLY ACTUATED FIGURE

BACKGROUND

1. Field of the Description

The present description relates, in general, to animatronic figures, and, more particularly, to systems and methods for externally actuating a passive character or figure to provide an animatronic figure that may be relatively small in size but can be moved in a realistic and believable manner.

2. Relevant Background

Animatronic figures are robotic mechanisms that are designed to reproduce the visual look and motion of characters. For example, many animatronic figures including those found in theme parks are animated with limbs that move using robotic joints. The characters provided in the form of animatronic figures may be human but are often fantastical characters that have been first created and presented to audiences in films and television programs using hand-drawn or computer graphics animation.

Providing animatronic figures that replicate the expected looks and movements of a character for an audience is an ongoing challenge for robotics engineers and designers. One major difficulty involves recreating the dynamics of motion of animated characters because in film there are no physical limitations as to what may be done or moves performed by such characters. For example, a character may twist their torso in a way that would be nearly impossible with a skeletal structure or may move an arm or leg rapidly in nearly any direction.

Further adding to the challenge of replicating such a wide range of movement and movement speeds is the fact that many of these characters have odd shapes and may be relatively small. Specifically, many of these characters are small compared to conventional robotic mechanisms or have shapes that cannot readily house cables, pulleys, and other robotic devices. In some exemplary implementations, it is desirable to provide animatronic figures to replicate characters from an animated film that have an "actual" or expected height of less than about one foot but have many articulations and move very quickly. In a specific example, it may be desirable to provide an animatronic figure in the form of a talking candle or the like that is about two feet tall with very little internal space or volume to contain or house robotic mechanisms (e.g., very skinny arms and trunk/post associated with a candelabra or other character features). However, the animatronic figure must move quickly to simulate the animated character known to observers or an audience from animated films, television programs, or video games. To date, animatronic figure designers have not been able to recreate these characters in robotic form in their true or desired scale due to the combination of size, shape, and high dynamic requirements.

In puppetry, the problems associated with small figures have been addressed using puppets that are manipulated via rods by human operators or puppeteers. In some cases, stiff wires or rods are attached to fabric hands or other portions of a puppet. The puppet may be operated from below with the wires kept relatively thin to limit their visibility. However, movement of the puppets is limited due to the simple rigid attachment to the puppet, and the resulting effect is often dependent on the skill of the puppeteer. A relatively complex form of puppetry is Japanese Bunraku. In this form of puppetry, one, two, or three puppeteers operate a single puppet using a combination of wooden rods and string-operated mechanisms to operate the legs, hands, arms, and face of a large puppet. The puppeteers wear black to artistically conceal their appearance but remain in plain sight of the audience. Such plain-sight operation is not desirable for many animatronic implementations with the complex arrangement of rods and string being better suited to very large puppets. Further, the use of live puppeteers is often too expensive, and completely automated systems are utilized to lower costs.

Hence, there remains a need for methods and systems for providing relatively small animatronic figures with large ranges of motion and desirable motion dynamics (e.g., high accelerations and velocities of the moving features or elements).

SUMMARY

The present invention addresses the above problems associated with small, dynamic figure design by providing a figure or character display assembly. The display assembly includes a robotic drive (or actuation) assembly that is configured to allow a small driven object (i.e., an animatronic figure) to be actuated externally (i.e., at least partially external to the figure with or without an internal actuator such as a mouth actuator).

In some embodiments of the robotic drive assembly, external actuation of the figure is achieved using rods that are each driven by a robotic mechanism (e.g., one to three or more rods each with a dedicated robotic drive). Each rod may include a miniature wrist that is mounted at the rod end distal to the robotic mechanism, and the wrists are each attached to key mounting points on the driven object or figure. For example, a driven object may have a body with two arms and a head. In such a case, the rods, via their wrists, may be attached to the head and to the hands on the arms. The rods pivot or rotate about a like number of centers of rotation that are spaced apart from the figure when the rods are driven by the robotic mechanisms, with such driving of the rods being synchronized and, typically, computer controlled.

In some non-limiting but only exemplary embodiments, the remote centers of rotation coincide with centers of holes in a screen or wall behind the figure so as to effectively conceal the robotic mechanisms. With appropriate design and controlled movement of the figure, the rods themselves may be hidden fully or at least partially from an observer's view. The figure is preferably formed so as to be flexible enough to respond or move passively with the motion of the head and hands to provide motion that is realistic to an observer of the display assembly. In this sense, the term "flexible" may mean that the figure's parts are formed of a non-rigid material such as a rubber (e.g., silicone) and/or may be sufficiently articulated such as by containing a collection of pivoting points.

In some implementations, the robotic drive assembly provides twenty-one degrees-of-freedom (DOF) using three nearly identical mechanisms (a robotic drive combined with a rod along with a wrist) that each provides seven DOF. Six of these DOF allow arbitrary position and orientation within a specified range of motion. A seventh DOF of each mechanism allows actuation of a jaw or mouth in the case of a head or similar feature of a driven object or figure (e.g., internal actuation) or actuation of a hand or similar feature of the driven object to provide a gripping or similar motion.

Alternative embodiments may provide six DOF for some driven features of the driven object such as six DOF for the hands of the object so as to eliminate the ability to grasp. In other embodiments, only five DOF may be provided for a feature of a driven object such as for a hand of a figure that results in a reduced ability to orient the hands (compared with the 6 DOF embodiments). Such reductions in DOF may be useful in some cases to reduce complexity of the drive mechanism and its associated controls and/or to reduce the size of the rods that are used to support the wrists to allow the rods to be more easily hidden from an observer's view.

More particularly, an apparatus or assembly is provided for displaying an animatronic figure, which is externally actuated such that it can be fabricated of flexible material or configured to be sufficiently articulated and such that it can be passive (e.g., not have internal robotic drives). The apparatus may include a display or set assembly providing a platform and a wall extending transverse from the platform. The wall has a hole through it that provides a passageway from a space behind the wall to the platform. The apparatus further includes a figure (or passive character structure) providing a body attached at one end to the platform (e.g., its base or feet may be affixed to the platform/stage/sidewall/ceiling). The figure includes a movable component (such as a hand, head, or the like) spaced apart from the attached end and flexibly connected to the body. The apparatus further includes a drive assembly with a robotic drive mechanism that may be positioned in the space behind the wall. The robotic mechanism includes a rod extending through the hole in the wall to a distal end. The distal end of the rod is attached to the movable component of the figure such that the figure is externally actuated to move on the platform when the rod is selectively moved by the robotic drive mechanism.

In some embodiments, the robotic drive mechanism is a remote center mechanism that rotates the rod about a center of rotation that is offset a distance from the movable component (i.e., a remote center is one that is floating in space and does not intersect with the physical pivot/bearing axis). For example, the center of rotation may be a remote center of rotation for the robotic drive mechanism and further the remote center of rotation for the robotic drive mechanism may coincide with the hole in the wall (e.g., in embodiments including a display or set assembly with a wall, the remote center may coincide with or be proximate to a center of the hole so as to better hide the rod and its robotic drive mechanism).

In some embodiments, the robotic drive mechanism includes at least six joints providing three translations and three rotations to drive the movable component with at least six degrees of freedom. To this end, the robotic drive mechanism may include a cable driven wrist mounted at the distal end of the rod and attached to the movable component of the figure. The wrist is actuated via cables extending through a hollow chamber of the rod, and, in some cases, the wrist is a 3-axis wrist providing at least two of the joints provided by the robotic drive mechanism to provide a rotation movement of the movable component. In some cases, the wrist further is configured to provide a third joint operable by the robotic mechanism to actuate a gripper, a jaw mechanism, or the like of the movable component (e.g., the wrist provides three of seven DOF of the movable component provided by the robotic drive mechanism).

In some embodiments of the apparatus, the figure further includes second and third movable components flexibly attached to the body. Then, the drive assembly may further include second and third drive mechanisms that are each positioned in the space behind the wall and include a rod extending though the wall to distal ends attached to the second and third movable components. In these cases, the drive assembly may further include a controller providing computer-based control over the robotic drive mechanisms to synchronize movement of the movable components via selective movement of the rods. For example, a processor may run a display program or other code devices to synchronize movement of the three movable components to animate the figure or character on the stage.

DETAILED DESCRIPTION

Briefly, the present invention is directed to an externally actuated figure assembly or system (also called a figure display assembly in this description). The system provides mechanisms that actuate an animatronic figure externally as opposed to using a mechanism that fits entirely within the figure. In one embodiment of the system, the animatronic figure has three features or components that are separately driven such as two hands and a head. In such an embodiment, three nearly identical robotic drive mechanisms may be used to control each hand and the head of the figure. The remainder of the figure (such as its arms, body/torso, and so on) moves passively in response to the head and hand motion.

In the system, external actuation is achieved by providing twenty-one joints. More specifically, the joints provide seven DOF for each drive mechanism, which may include a robotic mechanism with a rod having an articulatable wrist at its distal end that is attached to the figure's driven features (e.g., to its hands and head or the like). This provides an animatronic figure with an excellent range of motion and desirable dynamics. As will become clear, the system may include one to three or more robotic drive mechanisms that are each computer controlled to move an actuating rod (rigid rod) to externally actuate the animatronic figure (e.g., through synchronized movement of each rod about its center of rotation, which is spaced apart a distance from the figure such as to be floating in space behind a front portion of the figure exposed to a viewing space).

In the robotic drive mechanisms, each rod rotates about a remote center of rotation that may be a center of a hole in an opaque wall or screen, which allows the robotic mechanisms to be easily concealed from view. The system may include a 3-axis wrist that is mounted at the end of each of the rods providing a mounting point to the driven components of the figure. The wrists allow rotation of the driven parts or components of the figure (e.g., hands, head, and so on), with such movement being computer controlled through operation of the robotic mechanisms. A seventh joint may be provided at the end of each wrist to also provide control of subparts of the driven features or components (e.g., to allow controlled movement of a jaw/mouth in a head, to provide gripping or grasping with fingers of a hand, and so on).

Figure 1:
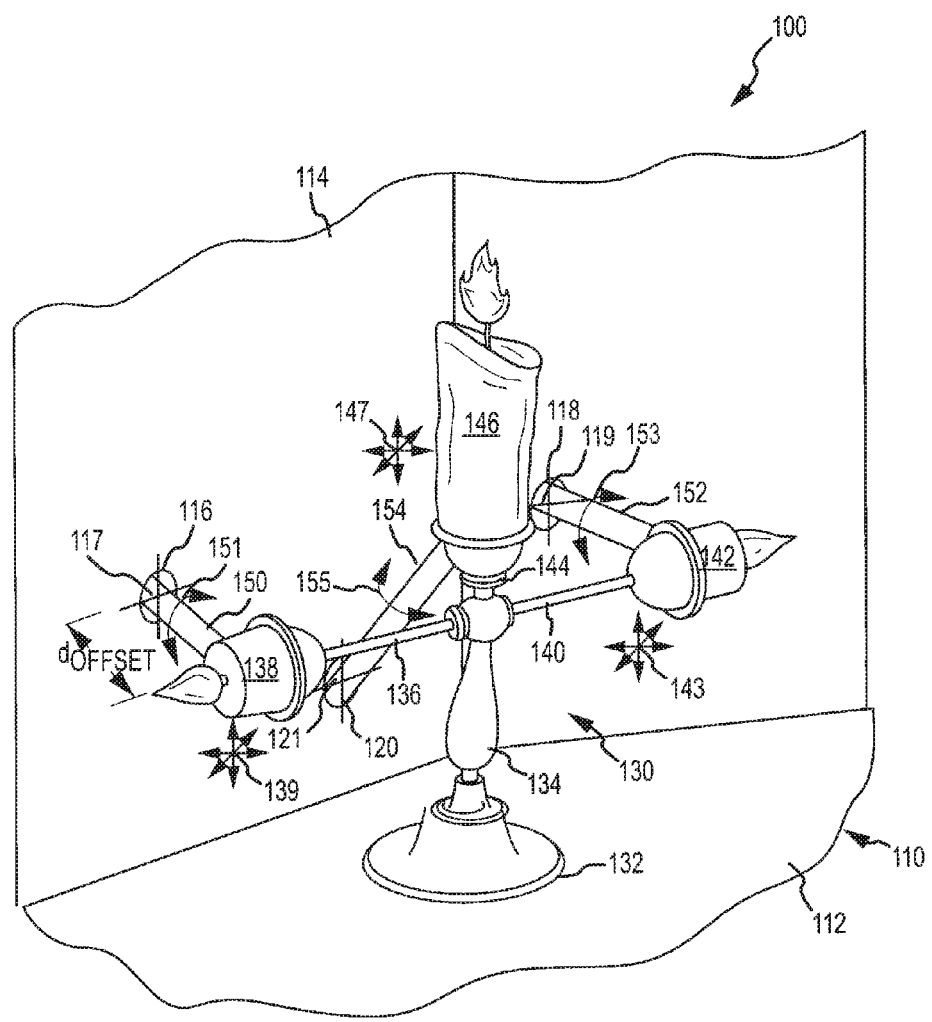
FIG. 1 is a perspective view of a character display assembly that includes an animatronic figure in the faun of a driven object or figure that is remotely actuated via rods having remote centers of rotation floating in space relative to the driven object (such as coinciding with centers of holes in a back wall or screen behind which robotic mechanisms, which are used to control movement of the rods and, in turn; the driven object, are effectively hidden from sight in embodiments including a display or set elements)

FIG. 1 illustrates an example of an externally actuated figure assembly 100 according to an embodiment of this description. The figure assembly 100 includes a set or stage 110 upon which an animatronic figure 130 is displayed and selectively caused to move via actuators that may be external to its moving parts and/or body and/or be internally positioned such as to provide a mouth actuator or the like. The set 110 includes a platform or base 112, and, as shown, the animatronic figure 130 may include a body or torso 134 with a bottom or base portion 132 that is rigidly attached to the platform 112 of the set 110. In this case, the figure 130 has the form of a candelabra with the bottom 132 being the pedestal of the candelabra that may be fixed to the platform 112 to provide stability to the animatronic figure 130 when other features or components are driven (e.g., the figure 130 moves about the stationary base 132). In other cases, the bottom 132 may be free to move on the platform 112 such that the figure 130 has left-to-right and forward-and-backward movements on the platform 112. Also, of course, the bottom 132 may take many other foam such as two or more feet at the ends of legs and so on.

The animatronic figure 130 includes three driven features or components. These include: (1) a first or right hand 138 that is attached to the body 134 via a first or right arm 136; (2) a second or left hand 142 that is attached to the body 134 via a second or left arm 140; and (3) a head 146 that is attached to the body 134 via a neck 144. As shown with sets of arrows 139, 143, 147, the right hand 138, the left hand 142, and the head 146 move during operation of the assembly 100 in any of three directions (X-Y-Z movements are provided in assembly 100) and with rotations 151, 153, 155 with movements and rotations of the rods 150, 152, 154. The body 134 as well as the arms 136, 140 and neck 144 move passively in response to the movements 139, 143, 147, 151, 153, 155 of these three driven components 138, 142, 146.

The set 110 further includes at least one or back wall, screen, or backdrop 114 that extends upward from the platform 112. The back wall 114 typically will be opaque or nearly so to conceal or at least mask a set of robotic mechanisms that is used to drive the figure 130. While the robotic mechanisms are not shown fully in FIG. 1, three driving elements or rods 150, 152, 154 are shown to extend outward from the back wall 114 and to be fixed to the driven components of the figure 130, i.e., to the right hand 138, the left hand 142, and the head 146. As is explained below, the connection between the rods 150, 152, 154 and the components 138, 142, 146 typically is achieved with a wrist that can be articulated remotely by the robotic mechanisms.

The back wall 114 includes holes 116, 118, and 120 with centers 117, 119, 121, and these holes 116, 118, 120 may be positioned behind (relative to a viewing space for the assembly 100) the driven components 138, 142, 146. The holes 116, 118, 120 provide a passageway through the back wall 114 to the animatronic figure 130 for the rods 150, 152, 154 (which, in turn, are each connected to robotic drive mechanisms).

The centers 117, 119, 121 (and robotic drive mechanisms) are positioned within the assembly 100 such that the centers 117, 119, 121 coincide with the centers of rotation for the rods 150, 152, 154, but this is not required to practice the invention. The centers of rotation (or centers 117, 119, 121 of the holes 116, 118, 120) are offset some distance, $d_{Offset}$, from the figure's driven components 138, 142, 146, such as a few inches to several feet depending upon the size of the figure and other parameters (e.g., the remote centers float in space and do not intersect the physical pivot/bearing axes). For example, the animatronic figure 130 may be 1 to 3 feet tall and the offset distance, $d_{Offset}$, may be 8 to 20 inches or the like. Since the rods 150, 152, 154 rotate about the centers 117, 119, 121 of these fixed holes 116, 118, 120, the holes 116, 118, 120 need only be slightly larger in diameter than the outer dimensions (e.g., outer diameter of a cylindrical rod) than the rods 150, 152, 154. In this manner, the assembly 100 provides an effective method for hiding the entire robotic drive assembly except for the portion of the rods 150, 152, 154 that passes through the backdrop 114.

Figure 2:
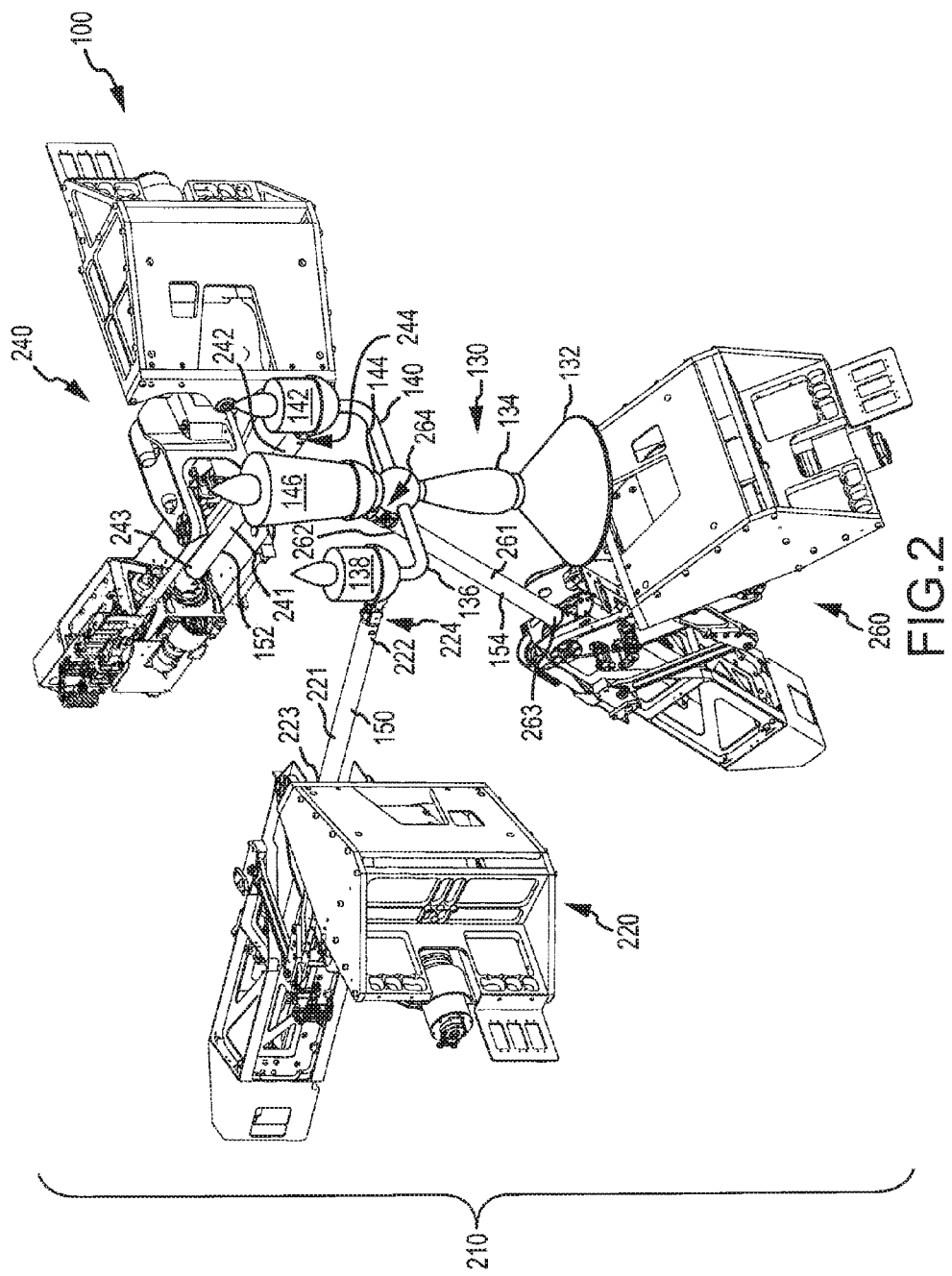
FIG. 2 illustrates the character or figure display assembly of FIG. 1 with the back wall removed to reveal a robotic drive assembly that includes three robotic mechanisms each selectively operable to drive a rod that is affixed at a distal end (e.g., with an articulatable wrist) to the three driven components of the animatronic figure.

FIG. 2 illustrates the externally actuated figure assembly 100 of FIG. 1 with the set 110 removed to show a robotic drive assembly 210 that may be used to externally actuate the animatronic figure 130. In assemblies such as assembly 100, a figure may have one, two, three, or more driven components, and the robotic drive assembly 210 typically will be configured to provide a robotic drive mechanism (or, more simply, a robotic mechanism) to externally actuate or drive each of these components. In figure assembly 100, the animatronic figure 130 has three driven components (i.e., hands 138, 144 and head 146). Hence, the robotic drive assembly 210 includes first, second, and third robotic mechanisms 220, 240, 260 to drive the hands 138, 144 and head 146, respectively.

Each of the robotic mechanisms 220, 240, 260 may be identical or at least similar in configuration and be designed to operate a rod 150, 152, 154 that is attached to the figure 130 at the right hand 138, the left hand 142, and the head 146. The first rod 150 is operated via a first end 223 that is attached to or supported by the first robotic mechanism 220 so that it pivots or rotates about its center of rotation 221 to selectively position or move a second or distal end 222 of the rod 150. At the distal end 222, a wrist or wrist assembly 224 is provided that is attached to the first or right hand 138. The center of rotation 221 is a point or location between the ends 222, 223 and, as discussed above with reference to FIG. 1, it may be positioned in assembly 100 to coincide with a hole or passage through a concealing screen or backdrop 114.

Similarly, a second rod 152 is operated via a first or proximate end 243 that is attached to or supported by the second robotic mechanism 240 so that it pivots or rotates about its center of rotation 241 to selectively position or move a second distal end 242 of the rod 152. At the distal end 242, a wrist 244 is provided that is attached to the second or left hand 142. The center of rotation 241 is a point or location on the rod 152 between the ends 242, 243 that may be located in or near a hole/passage through a concealing screen or backdrop 114 (shown in FIG. 1). A third rod 154 is operated via a first or proximate end 263 that is attached to or supported by the third robotic mechanism 260 so that the rod 154 pivots or rotates about its center of rotation 261 to selectively position or move a second distal end 262 of the rod 154. The distal end 262 supports a wrist 264 that is attached to the third driven component or head 146. Again, the center of rotation 261 is a point or location on the rod 154 between ends 262, 263 that may be located in assembly 100 in or near a hole/passage through a concealing screen or backdrop 114 (shown in FIG. 1 to coincide with a center 121 of a hole 120 in backdrop 114).

As explained below, the assembly 100 is configured to actuate the figure 130 externally (or at least partially externally) via the three robotic mechanisms 220, 240, 260 of drive assembly 210. Together, the three robotic mechanisms 220, 240, 260 provide the animatronic figure 130 with up to twenty-one independently controlled motions. Although not shown, the assembly 100 would include power supplies (e.g., servo drives) for the mechanism 220, 240, 260 as well as a controller (e.g., a computer with software such as a display program) that operates to synchronize operation of mechanisms 220, 240, 260 to move the figure 130 through a wide range of desired movements via external actuation or driving of the three components 138, 142, 146 (and internal actuation in some cases may be provided such as with one or more mechanisms 220, 240, 260 being used for a mouth actuator or other internally positioned actuator for a figure). As shown, a rod 150 of mechanism 220 is attached to the right hand 138, a rod 152 of mechanism 240 is attached to the left hand 142, and a rod 154 of mechanism 260 is attached to the head 146.

When implemented, each of the three robotic mechanisms 220, 240, 260 would typically be fixed to a larger support frame (which is not shown) to support the mechanisms 220, 240, 260 and their rods 150, 152, 154 relative to a backdrop 114 of a set 110 to place the centers-of-rotation 221, 241, 261 coincident or proximate to centers of holes in a backdrop 114 (e.g., coincident with centers 117, 119, 121 of holes 116, 118, 120 in backdrop 114 as shown in FIG. 1). The base or "feet" 132 of the animatronic figure 130 would also typically be resting on a fixed surface (such as platform 112 of set 110 shown in FIG. 1) and may, in some cases, not move (e.g., may be fixed or attached to platform 112). The figure 130 may be passive with its body 134, arms 136, 140, neck 144, and/or other components or parts constructed of a flexible material such as silicone rubber, fabric, or the like or constructed with pivoting joints and the like to be sufficiently articulated by the mechanisms 220, 240, 260.

The following description describes one of the mechanisms 220, 240, 260 with a full description of each not being necessary as each of the mechanisms 220, 240, 260 may have identical or similar configurations and be operated in a similar manner. Also, while three drive mechanisms 220, 240, 260 are shown in FIGS. 1 and 2, it should be understood that the invention is not limited to the use of three drive mechanisms 220, 240, 260. The assembly 100 could readily be modified to include fewer or more mechanisms depending upon or to suit the particular animatronic figure 130 (e.g., some figures may only require one drive mechanism 220 with its drive rod 150 and wrist 224 while other figures or characters may be better manipulated with four, five or more drive mechanisms).

Figure 3:
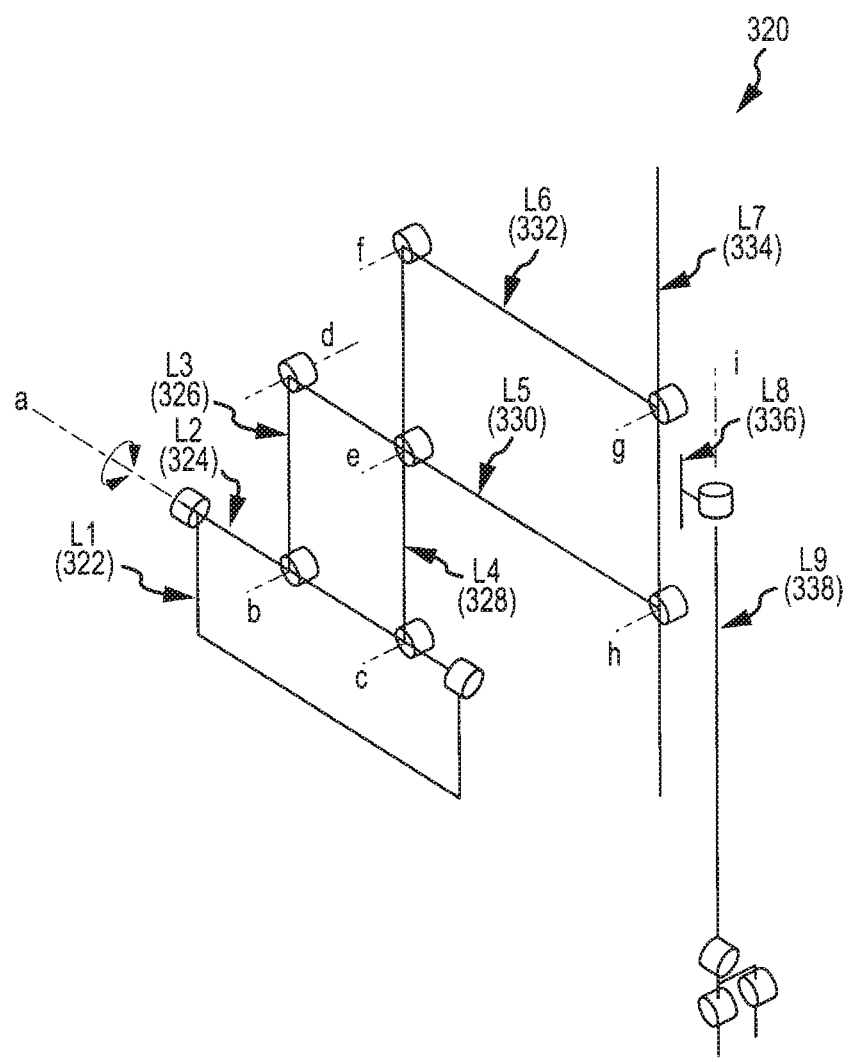
FIGS. 3 and 4 provide schematic illustrations of a single robotic mechanism showing links and pivots as may be utilized in implementing each of the robotic mechanisms of the robotic drive assembly of FIG. 2.
Figure 4:
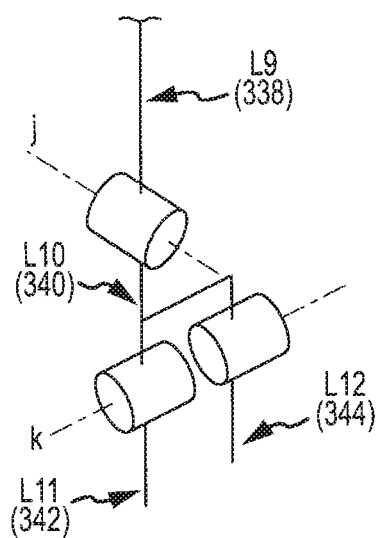

FIGS. 3 and 4 illustrate schematically a single robotic mechanism 320 showing links and pivots as may be utilized in implementing each of the robotic mechanisms 220, 240, 260 of the robotic drive assembly 210 of FIG. 2. The first link L1 (322) is a fixed base link while the second link L2 (324) rotates within the first link L1 (322) about pivot axis a. The third, fourth, fifth, sixth, and seventh links L3-L7 (326, 328, 330, 332, 334) are configured and interconnected so as to form a planar 4-bar linkage. This 4-bar linkage is described in more detail with reference to FIG. 5 and may be one of several types of remote-center linkages. The 4-bar linkage provided by the third, fourth, fifth, sixth, and seventh links L3-L7 (326, 328, 330, 332, 334) pivots about the second link L2 (324) about pivot axes b and c.

The eighth link L8 (336) is supported by the seventh link L7 (334) of the four-bar linkage, and the eighth link L8 (336) translates relative to the seventh link L7 (334) in the direction of pivot axis i. Pivot axis i intersects pivot axes a, g, and h. The ninth link L9 (338) is supported by the seventh link L7 (334) and rotates relative to it about axis i. The tenth link L10 (340) rotates relative to the ninth link L9 (338) about pivot axis j. Further, as shown, the eleventh link L11 (342) and the twelfth link L12 (344) rotate relative to the tenth link L10 (340) about pivot axis k.

Figure 5:
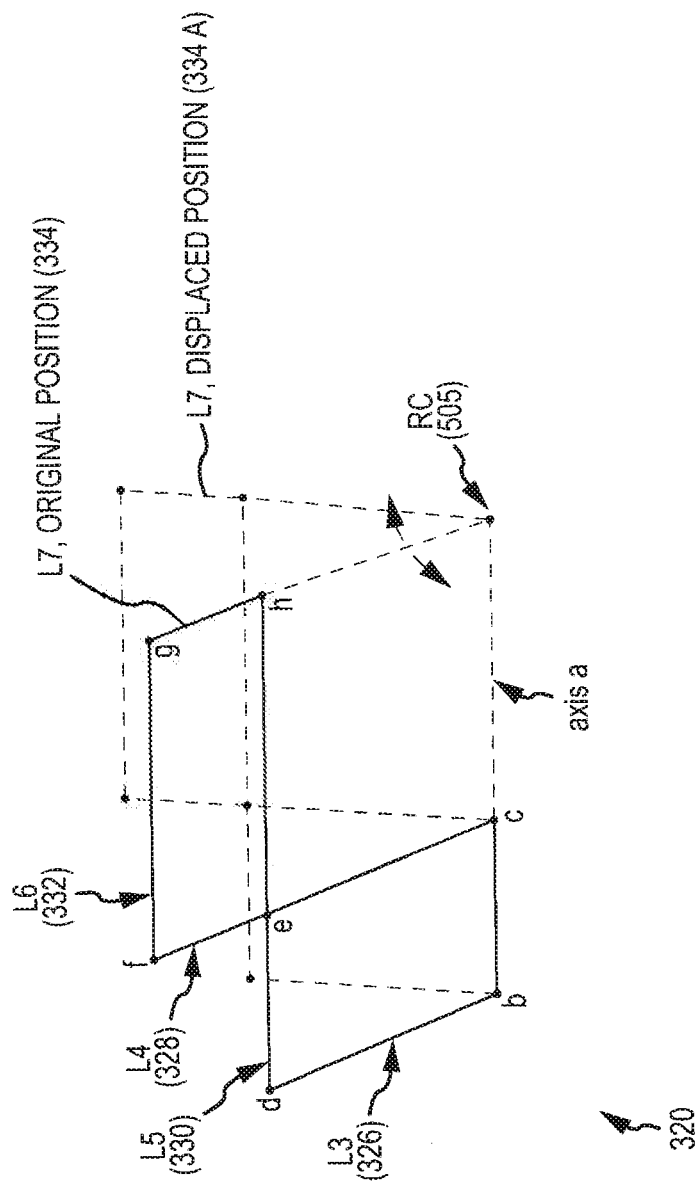
FIG. 5 is a schematic illustration of a 4-bar linkage of the robotic mechanism of FIG. 3 showing operation of the linkage and its remote center point.

To further clarify use of each robotic mechanism of a robotic drive assembly (such as assembly 210 of FIG. 2) to externally actuate a figure through use of remote centers of rotation, it may be useful to provide further description of the 4-bar linkage that is configured as a remote-center linkage. FIG. 5 illustrates a portion of the robotic mechanism 320 showing operation of the 4-bar linkage formed by the third, fourth, fifth, sixth, and seventh links L3-L7 (326, 328, 330, 332, 334). The solid lines show the 4-bar linkage in a first position while the dashed lines show the 4-bar linkage in a second or displaced position (i.e., see the displaced seventh link L7 (334A)).

The linkage is a parallelogram such that the rotation of the third link L3 (326) is equal to the rotation of the seventh link L7 (334). If a line passing through points g and h is intersected with pivot axis a (passing through points b and c), the line and the pivot axis a intersect at a point 505 labeled "RC" to indicate this is the remote center of rotation for the mechanism 320. The RC point 505 does not move as the linkage formed by the third, fourth, fifth, sixth, and seventh links L3-L7 (326, 328, 330, 332, 334) is operated. Because the RC point 505 lies on pivot axis a, the RC point 505 remains stationary as the entire planar 4-bar linkage formed by the third, fourth, fifth, sixth, and seventh links L3-L7 (326, 328, 330, 332, 334) is rotated about the pivot axis a. Since RC point 505 is a fixed point of rotation that is not part of the actual mechanism (but may be located on or within a component of the robotic mechanism such as in or on the rigid drive rod used to externally actuate a driven object or figure), the point 505 is known as a remote center of rotation.

Figure 6:
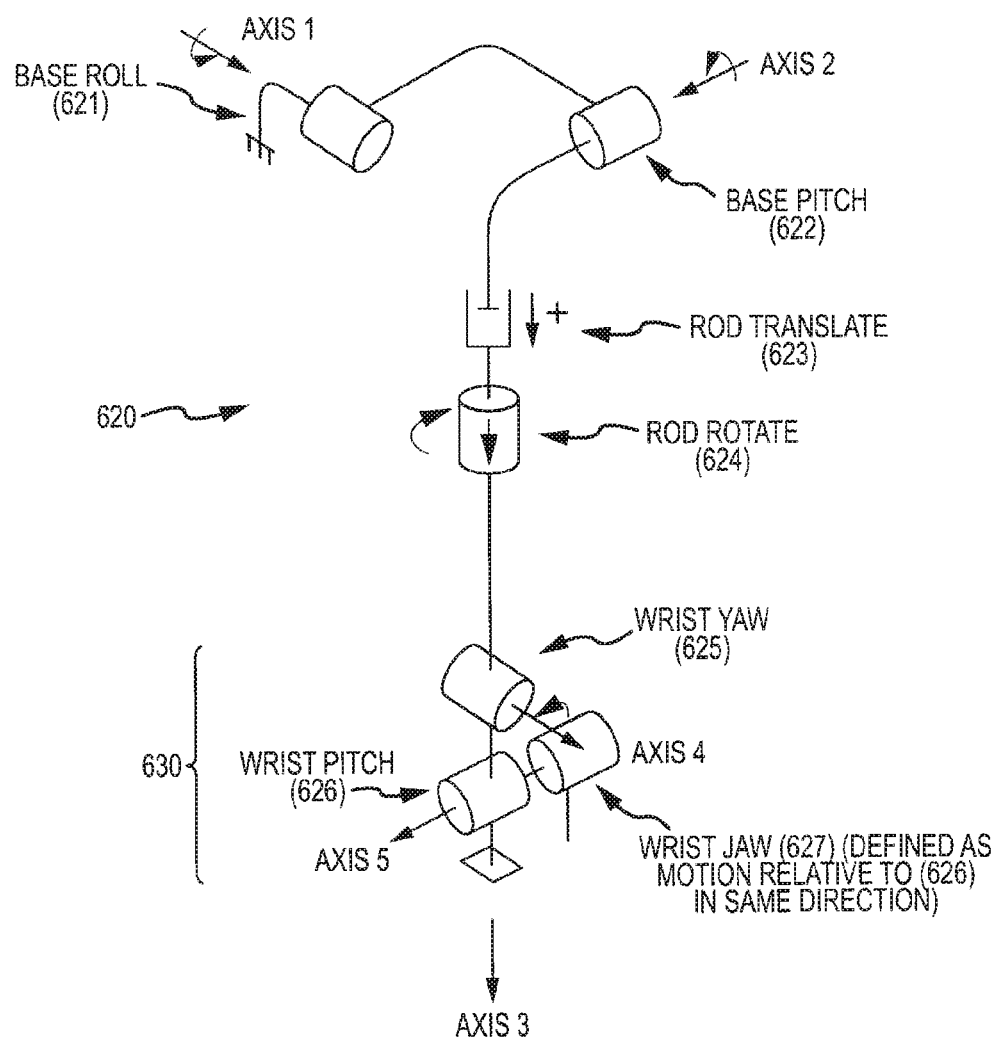
FIG. 6 is a schematic illustration of a robotic mechanism useful for providing the seven degrees of freedom (DOF) kinematics achieved with each robotic mechanism.

Because the seventh link L7 (334) rotates in two DOF about the RC point 505, a kinematic description of a robotic mechanism 620 shown in FIG. 6 can be provided that is independent of the actual linkage mechanism. In FIG. 6, seven joints are described and may be thought of as joints 1-7 (e.g., joint 1 is labeled 621, joint 2 is 622, and so on (i.e., 62N would be joint N)), and the motions about these joints and axes are referred to in later descriptions of the range of motion of the robotic mechanism to simplify the description. In FIG. 6, the linkage of mechanism 620 is described as a serial linkage with seven joints.

The first joint of the mechanism 620 is the base roll joint 621, which operates or rotates about Axis 1 (which coincides with pivot axis a in FIG. 3). The second joint of the mechanism 620 is the base pitch joint 622 that provides a rotation about Axis 2. Axis 2 does not coincide with an actual pivot axis of a mechanism (such as mechanism 320 of FIG. 3) because it passes through the RC point of mechanism 620. The third joint of mechanism 620 is the rod translate joint 623 that provides a translation along Axis 3, which corresponds to the translation of the eighth link L8 (336) relative to the seventh link L7 (334) along axis i of the mechanism 320 of FIG. 3. The fourth joint of the mechanism 620 is the rod rotate joint 624 is a rotation about Axis 3, which corresponds to a rotation of the ninth link L9 (338) about pivot axis i. Again, note, the axis i along the ninth link L9 (338) always passes through the RC point (point 505 shown in FIG. 3).

Finally, at the end of the rod of mechanism 620 (distal relative to the robotic mechanism 620 driving components) is a wrist 630, which is attached to a figure or driven object (such as figure 130 shown in FIGS. 1 and 2). The fifth joint of mechanism 620 is within the wrist 630 and is the wrist yaw joint 625. This joint 625 provides a rotation about Axis 4, which corresponds to a rotation of the tenth link L1.0 (340) about pivot axis j (shown in FIGS. 3 and 4) with Axis 4 coinciding with pivot axis j. The sixth joint of mechanism 620 is also in wrist 630 and is the wrist pitch joint 626. The wrist pitch joint 626 provides a rotation about Axis 5, which corresponds to a rotation of the eleventh link L11 (342) about pivot axis k that coincides with Axis 5. The seventh joint of mechanism 620 is in wrist 630 and is the wrist jaw joint 627. The jaw joint 627 provides a rotation relative to the sixth joint or wrist pitch joint 626 about the same axis, i.e., about Axis 5.

Figure 7:
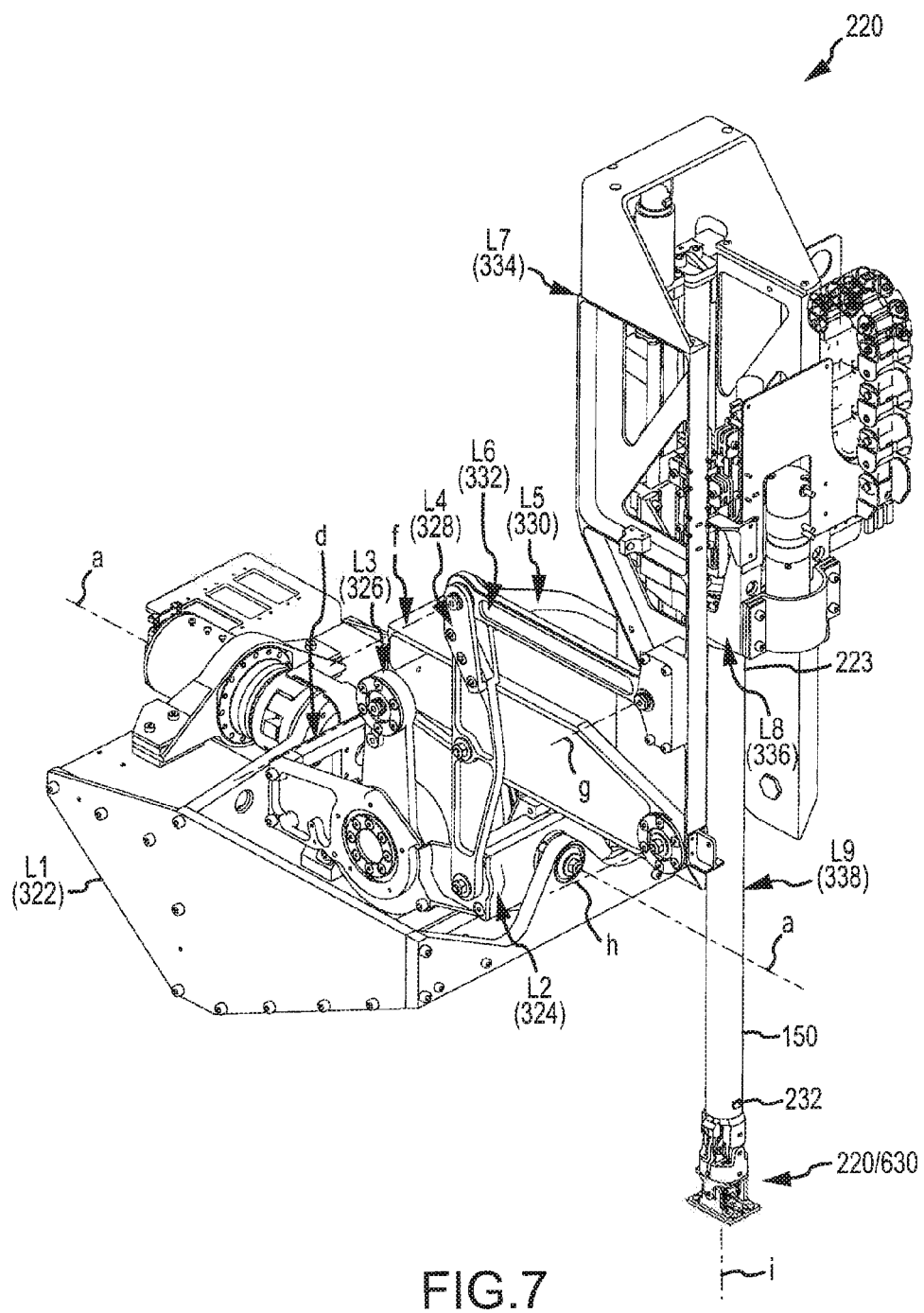
FIG. 7 is a perspective view of one of the robotic mechanisms of the drive assembly of FIG. 2 providing more detail and showing main links of the robotic mechanism used to provide 7 DOF and a remote center of rotation (e.g., coinciding with a point on a rod that is manipulated by the mechanism to drive the character or figure)

FIG. 7 illustrates the robotic mechanism 220 in more detail with labeling of its components being taken from FIGS. 2-6 to show how the links may be implemented in one embodiment. The robotic mechanisms 240, 260 of drive assembly 210 may be implemented in similar fashion.

Figure 8:
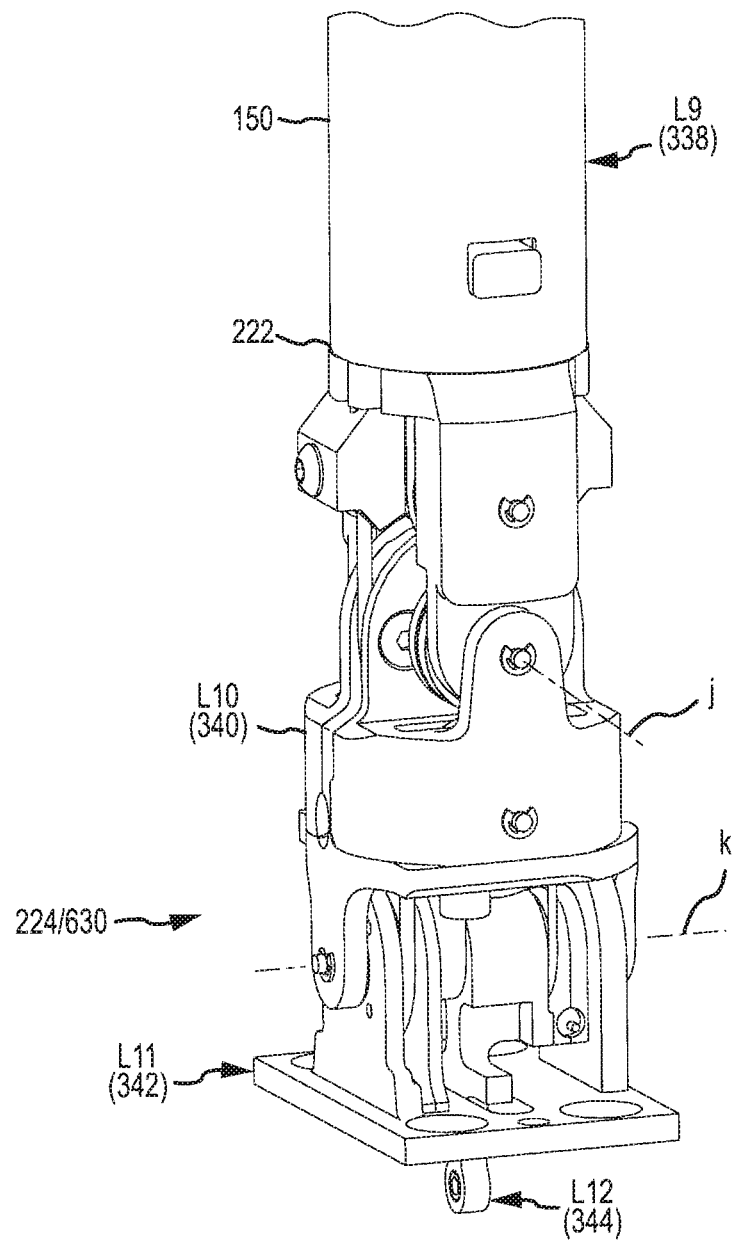
FIG. 8 is an enlarged illustration of the wrist of the robotic mechanism of FIG. 7 showing one useful implementation of a wrist used to attach a rod to an animatronic figure that is externally actuated.

FIG. 8 provides an enlarged view of one embodiment of a wrist such as wrists 224 and 630 that may be employed in a robotic assembly 220. The wrist 224, 630 is attached at the second or distal end 222 of the rod 150 (or ninth link L9 (338)). The wrist 224, 630 is attached, via plate or eleventh link L11 (342) as well as via the twelfth link L12 (344), to a driven feature or component of a driven object or figure, such as to a hand, a head, or other driven portion of a character that is to be animated or selectively positioned/moved by the mechanism 220. The wrist 224, 630 provides the tenth, eleventh, and twelfth links L10-L12 (340, 342, 344), and the specific configuration of the wrist 224, 630 to provide links is generally not limiting of the invention as long as these links are able to rotate or pivot about pivot axes j and k.

Figure 9:
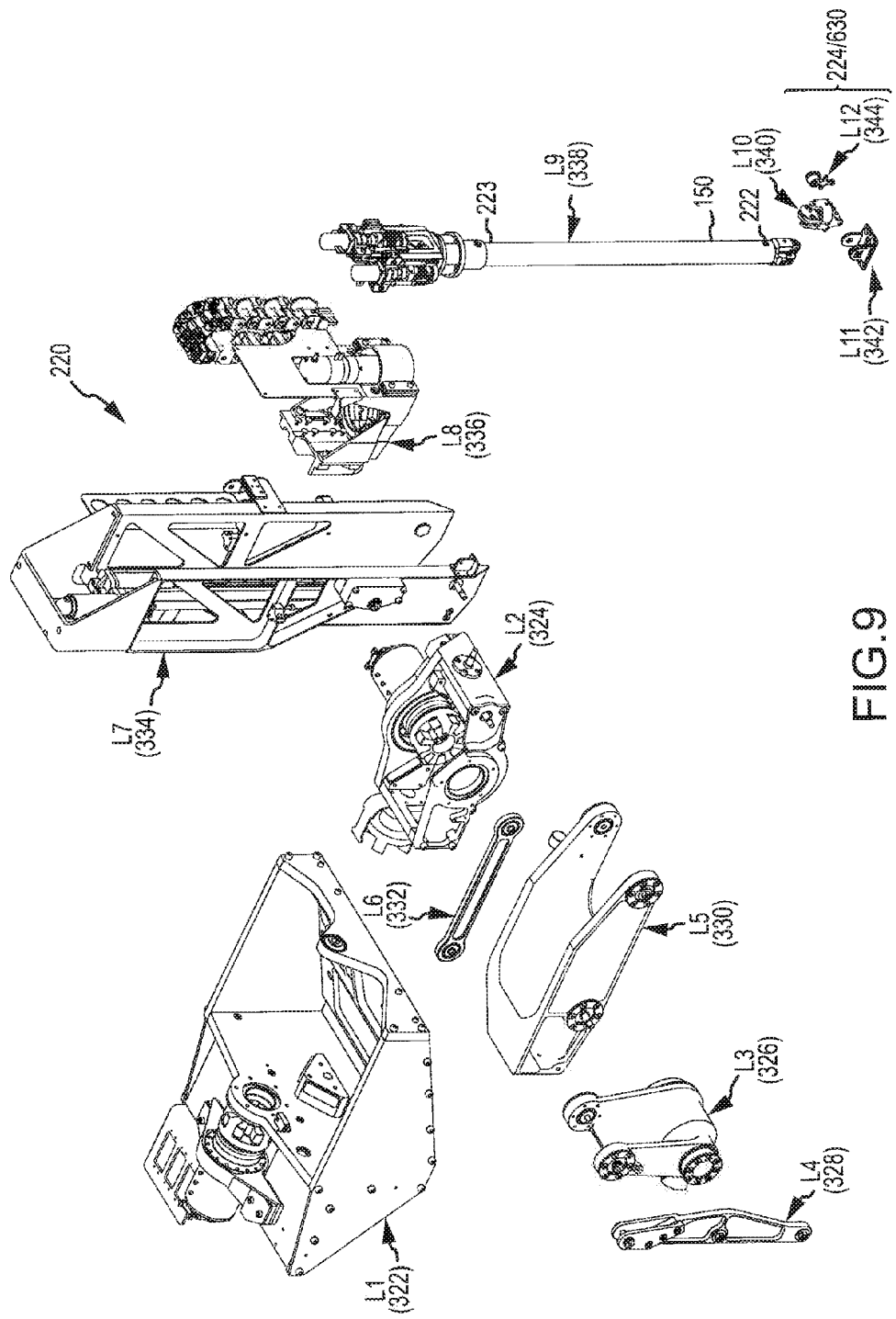
FIG. 9 is an exploded view of the robotic mechanism of FIGS. 7 and 8.
Figure 10:
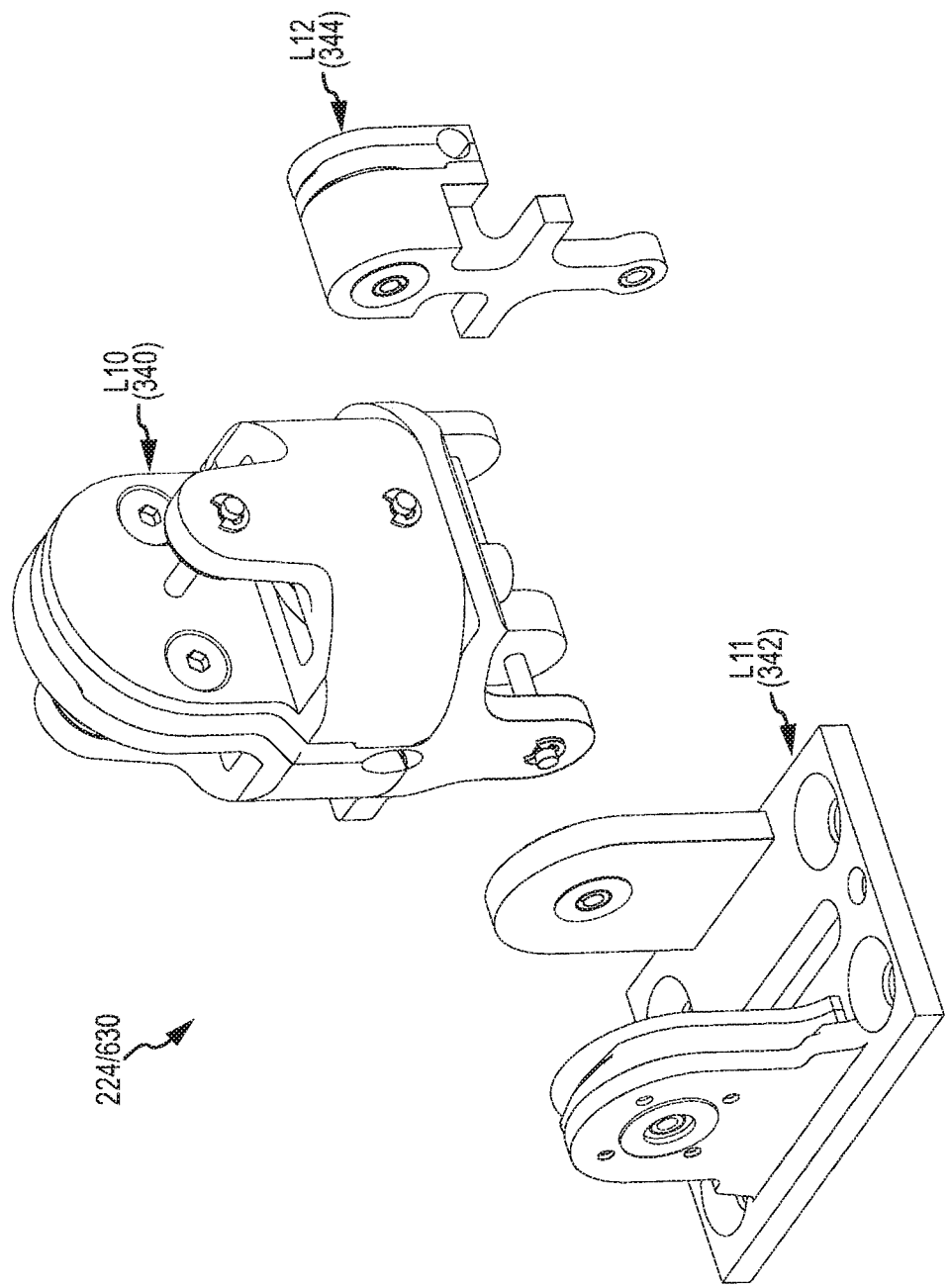
FIG. 10 is an exploded view of the wrist attached to a driving rod of the robotic mechanism of FIGS. 7-9.

FIG. 9 shows an exploded view of the robotic mechanism 220 showing exemplary structural components and mating or coupling of such components to provide the various links of the mechanism 220. Similarly, FIG. 10 illustrates an exploded view of the wrist 224, 630 showing structural components and their interconnection that may be used to provide the desired links of the wrist 224, 630 to selectively actuate a figure attached to the wrist 224, 630 (i.e., to plate or eleventh link L11 (342)).

Figure 11:
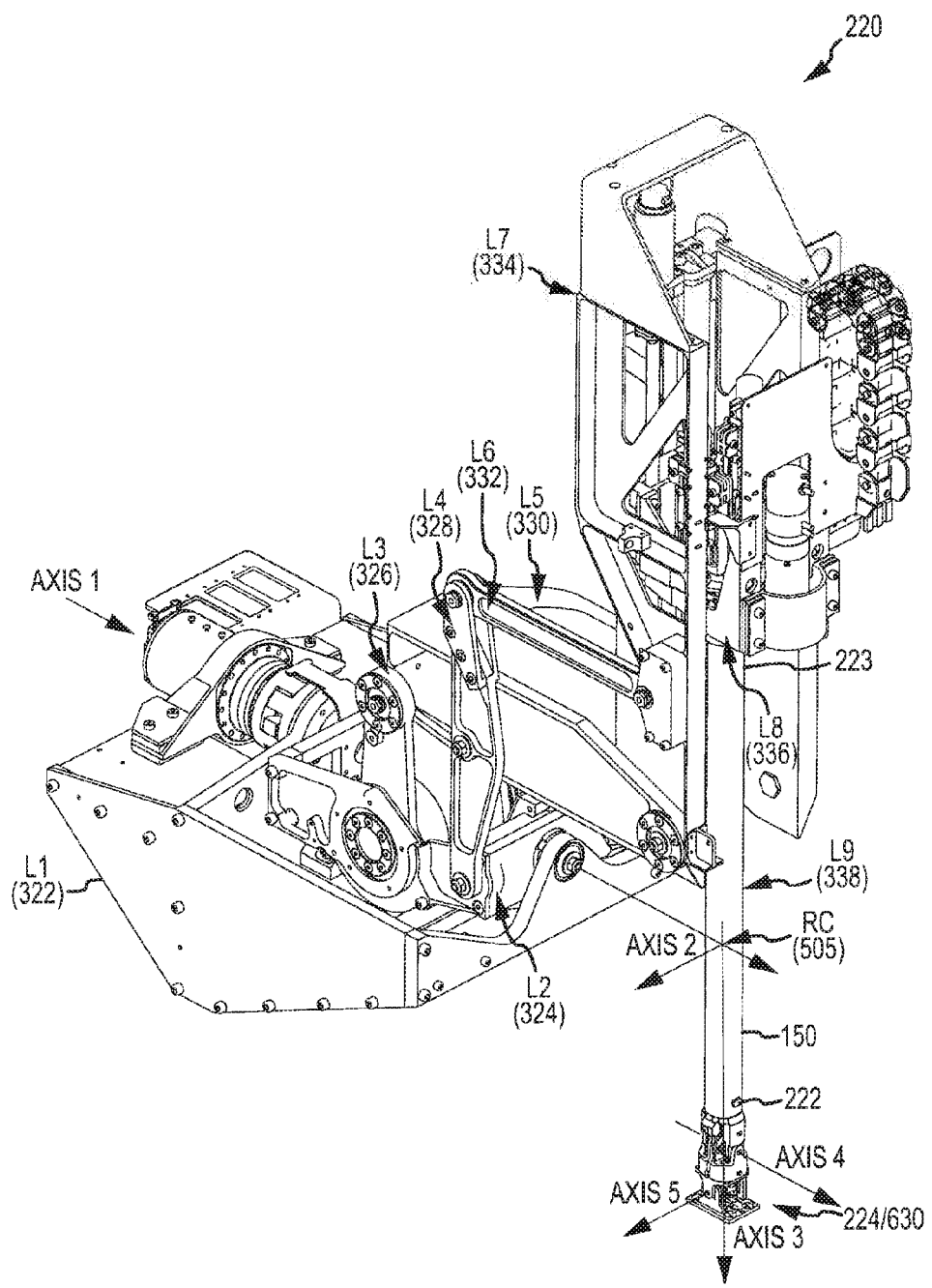
FIG. 11 illustrates the robotic mechanism of FIG. 7 with an overlay of the joint or rotation axes shown in FIG. 6 illustrating the 7 DOF provided by the robotic mechanism.

FIG. 11 illustrates the robotic mechanism 220 with the more general joint axes provided in FIG. 6 applied to or shown in the particular mechanism implementation. Again, the mechanism 220 has seven joints to provide 7 DOF. The first joint is the base roll joint (joint 621 in FIG. 6) that provides rotation of the entire mechanism 220 (including the rod 150 or ninth link L9 (338)) about Axis 1. The second joint is the base pitch joint (joint 622 in FIG. 6) that is a rotation of the rod 150 or ninth link L9 (338) about Axis 2, with Axes 1 and 2 passing through the RC point 505 of the mechanism 220. The third joint is the rod translate joint (joint 623 in FIG. 6) and is a translation of the ninth link L9 (338) or rod 150 along Axis 3.

The fourth joint is the rod rotate joint (joint 624 in FIG. 6) and is a rotation of the ninth link L9 (338) or rod 150 about Axis 3. The fifth joint is the wrist yaw joint (joint 625 in FIG. 6) and is a rotation of the tenth link L10 (340) in the wrist 224, 630 about Axis 4. The sixth joint is the wrist pitch joint (joint 626 in FIG. 6) and is a rotation of the eleventh link L11 (342) in the wrist 224, 630 about Axis 5. The seventh joint is the wrist jaw joint (joint 627 in FIG. 6) and is a rotation of the twelfth link L12 (344) in the wrist 224, 630 about Axis 5.

In the following set of figures, the single 7 DOF robotic mechanism 220 (which would operate similarly to mechanisms 240, 260) is shown as it is moved through its ranges of motion. For example, the mechanism 220 may be moved or operated to move to these various positions in response to control signals from a controller (e.g., a computer-based controller running one or more display programs/code devices to synchronize operation of one to three or more such robotic mechanisms to actuate a figure) so as to externally actuate or drive a figure attached to the wrist 224 (or 630) of the mechanism 220.

Figure 12:
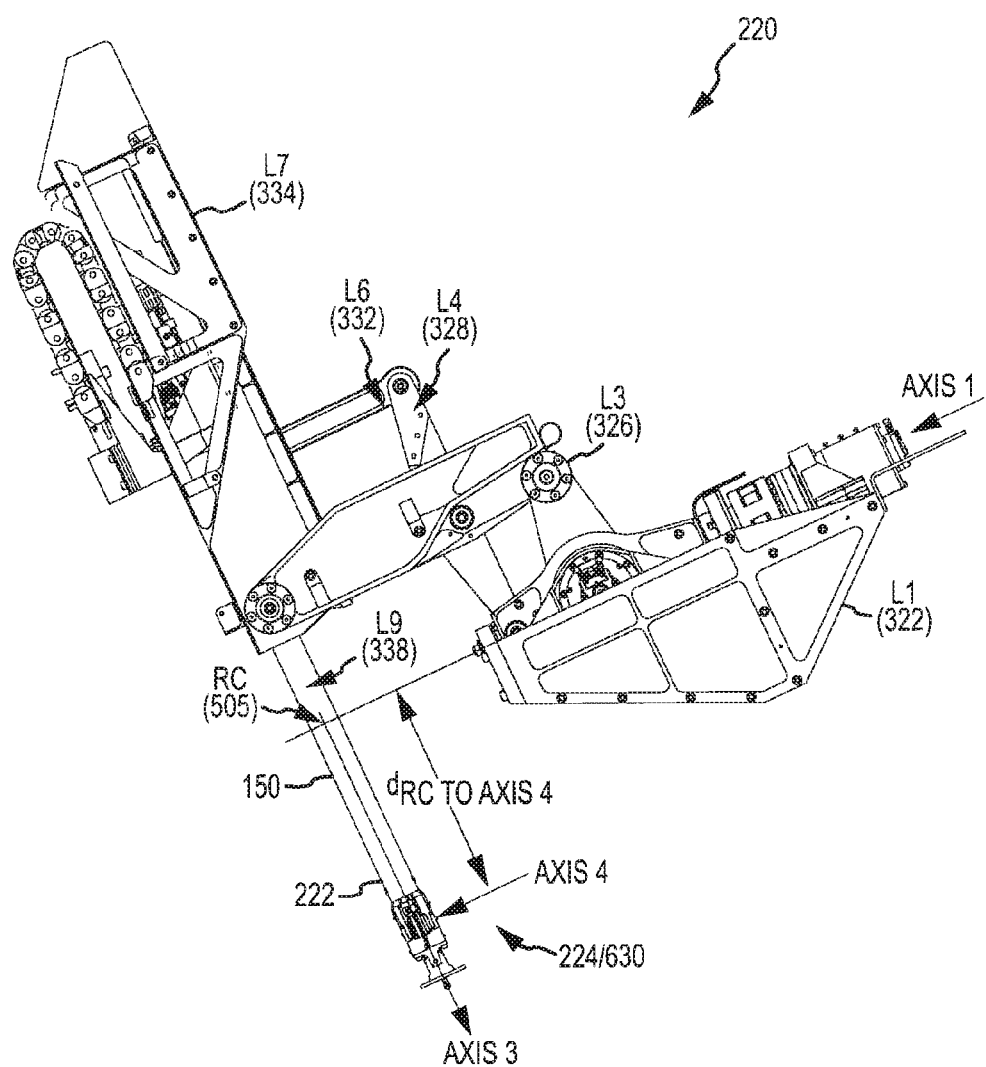
FIGS. 12-25 illustrate portions of the robotic mechanism of FIG. 7 showing the 7 DOF mechanism being moved to limits of its various ranges of motion (e.g., motion of each of the 7 joints used to provide the 7 DOF of the mechanism)

FIG. 12 illustrates a side view of the robotic mechanism 220 in a nominal or zero position. The RC point 505 is located at the intersection of Axis 1 (passing through the first link L1 (322)) and Axis 3 (coincident with longitudinal axis of rod 150 or the ninth link L9 (338)), and the distance, $d_{RC\ to\ Axis\ 4}$, from the RC point 505 to Axis 4 passing through wrist 224, 630 provides an offset between the RC point 505 and the figure at such a nominal position (e.g., the offset from an RC point 505 and the figure's driven component may be at least this distance such as about 200 millimeters or the like at midstroke or a zero position). In the "zero" position, all seven joints are at zero degrees rotation and/or zero translation/displacement (at 0 mm along a translation axis).

Figure 13:
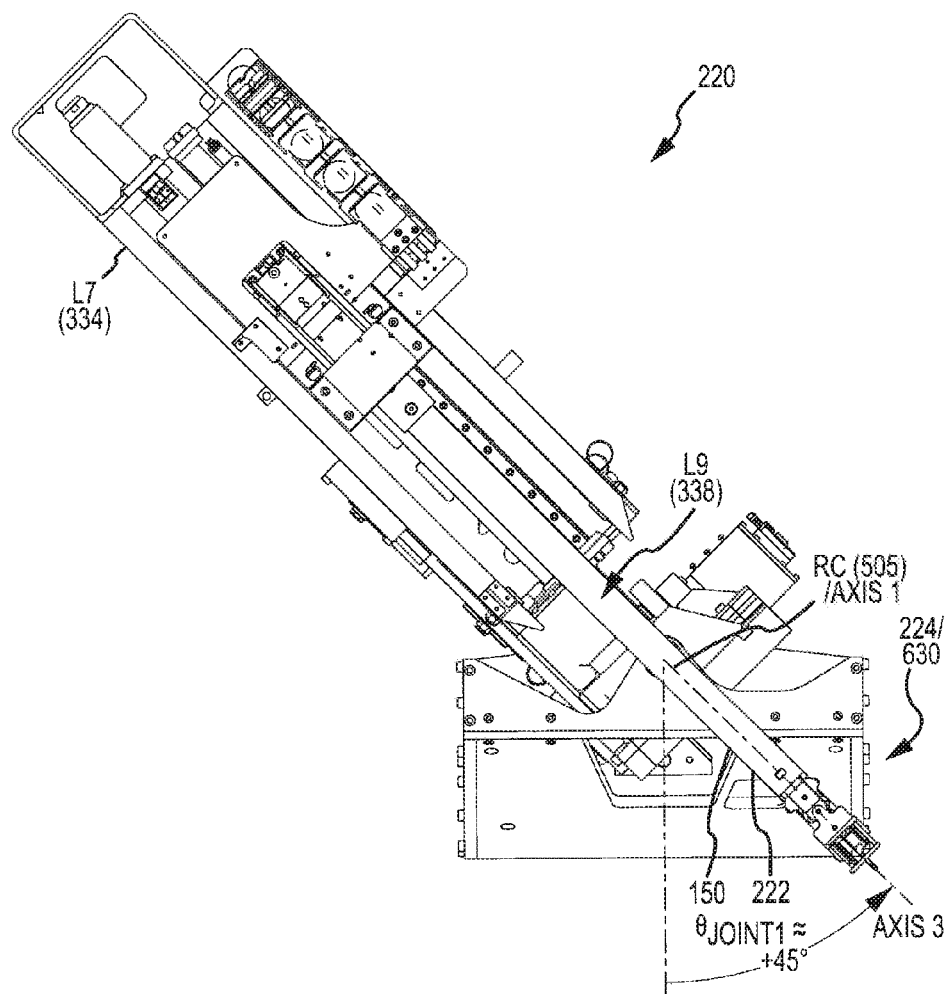
Figure 14:
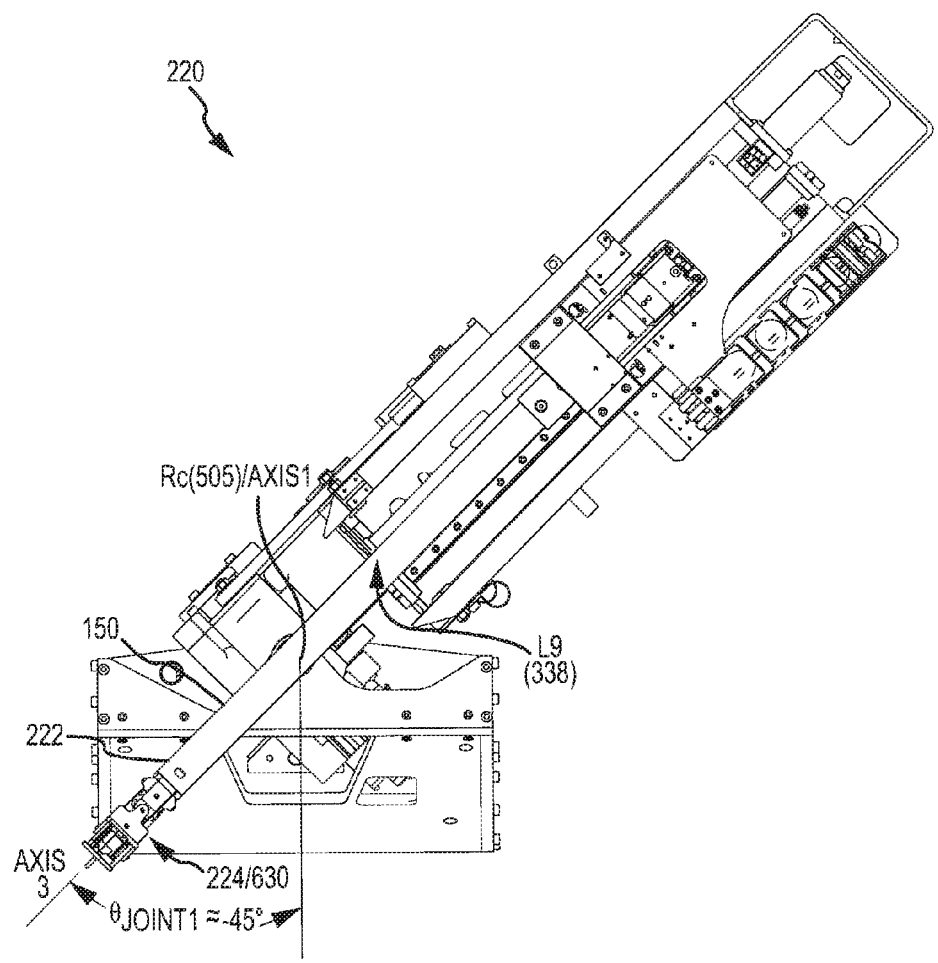
Figure 15:
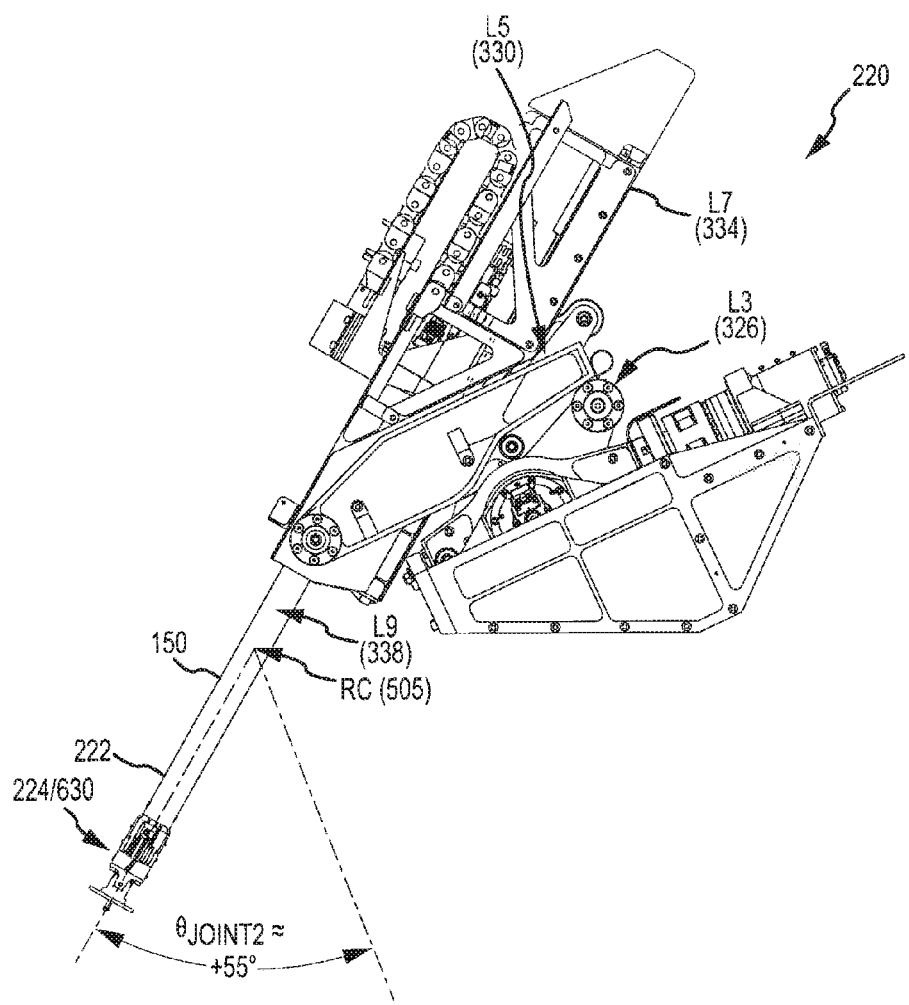
Figure 16:
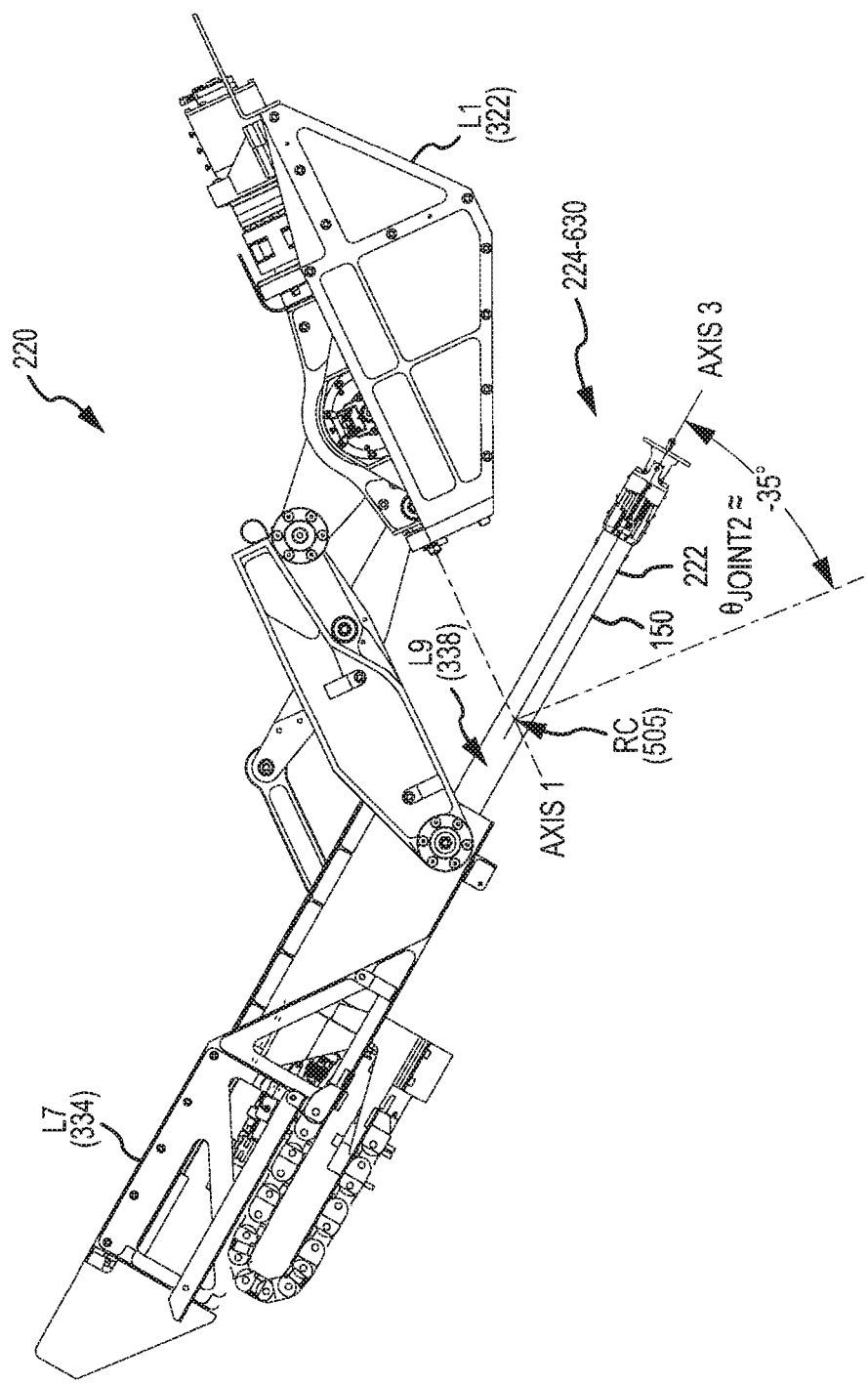

FIGS. 13 and 14 illustrate the robotic mechanism 220 with the first joint or base roll joint (joint 621 of FIG. 6) moved through its range of motion. This range may be a rotation about the Axis 1 shown by the angle, $\theta_{Joint\ 1}$, of +45 to −45 degrees (as shown in the illustration of mechanism 220 in FIGS. 13 and 14, respectively). FIGS. 15 and 16 illustrate the robotic mechanism 220 with the second joint or base pitch joint (joint 622 of FIG. 6) moved through its range of motion. This range may be a rotation of motion as shown by angle, $\theta_{Joint\ 2}$, which may be a rotation between +55 to −35 degrees (as shown).

Figure 17:
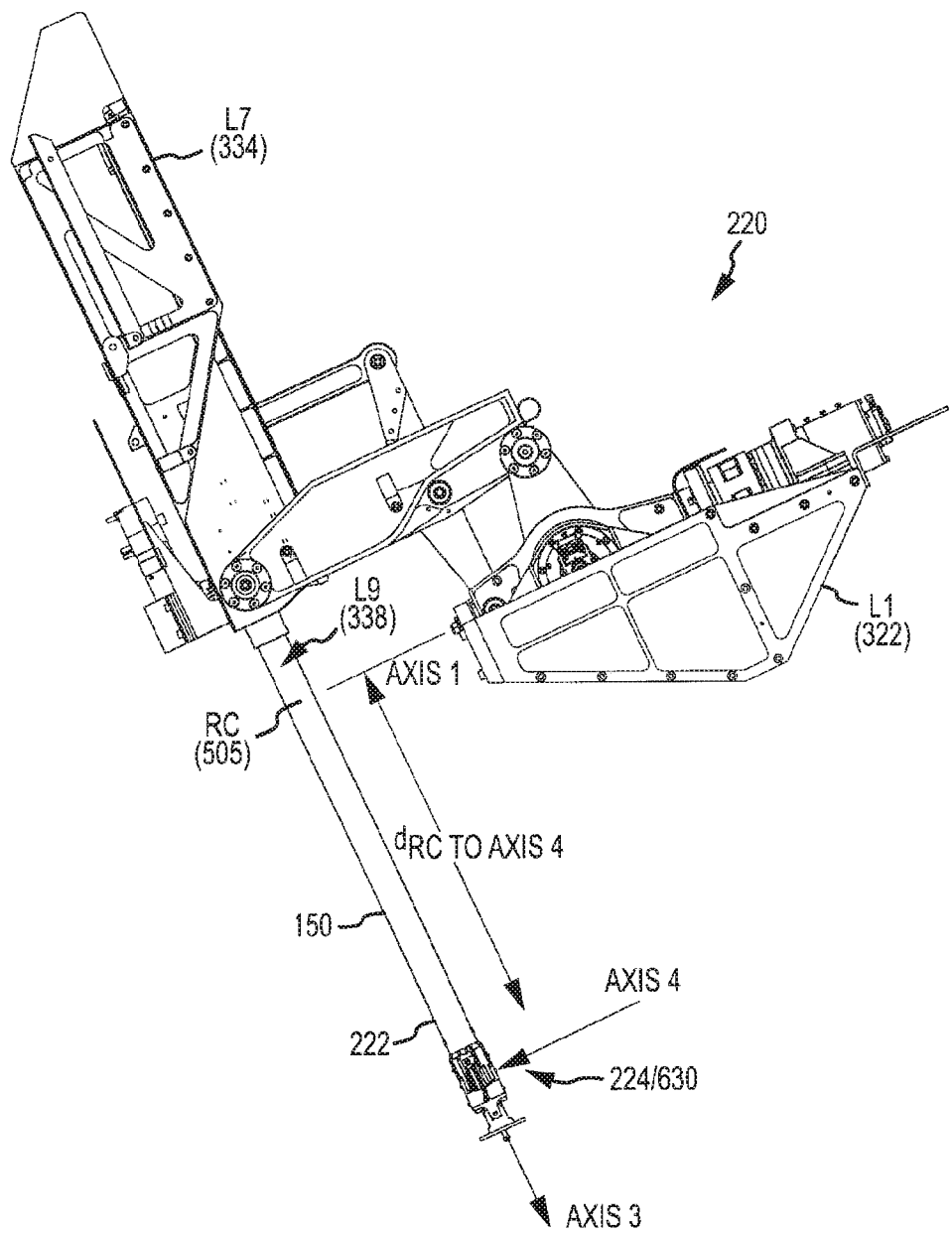
Figure 18:
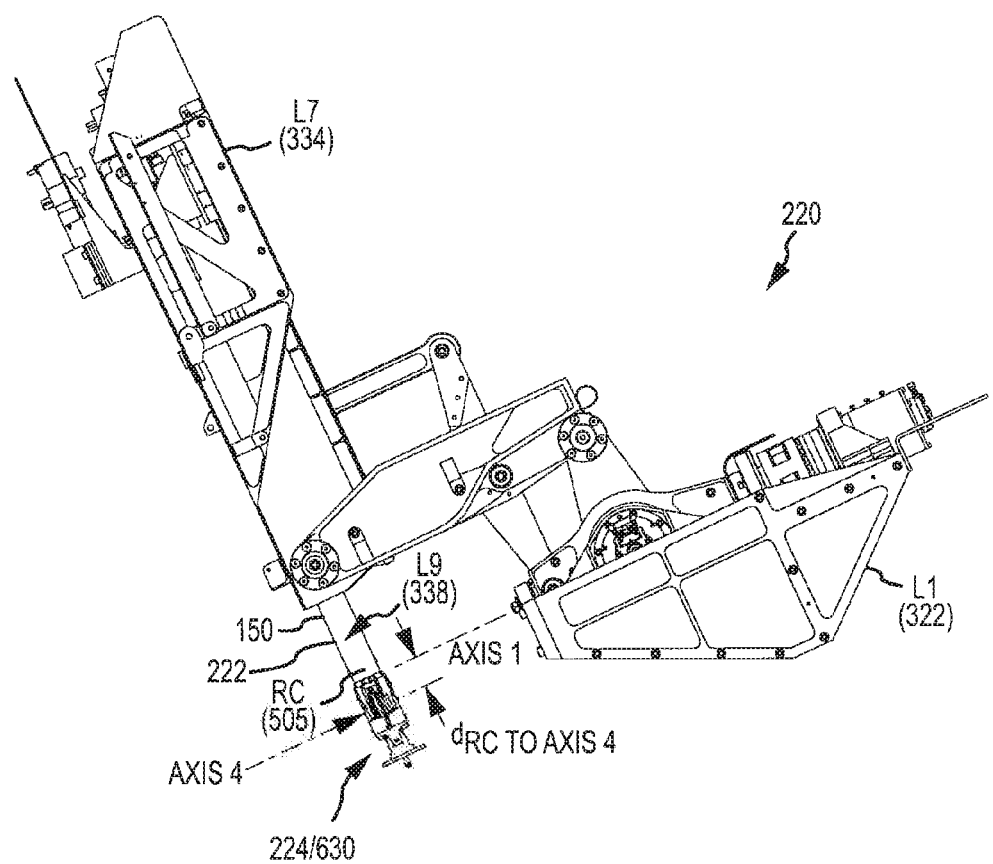

FIGS. 17 and 18 show the robotic mechanism 220 with the third joint or rod translate joint (joint 623 of FIG. 6) moved through a range of motion from the zero position. As shown in FIG. 17, the distance, $d_{RC\ to\ Axis\ 4}$, is significantly increased from its zero position (e.g., rod 150 moved outward 150 to 200 mm such as about 180 mm in some cases away from supporting portions of robotic mechanism 220). In FIG. 18, the distance, $d_{RC\ to\ Axis\ 4}$, is significantly decreased from its zero position (e.g., rod 150 moved inward 150 to 200 mm such as about 180 mm in some cases toward the supporting portions of the mechanism 220). In this way, a driven component (hand, head, or the like) of figure may be moved down and up stage, respectively.

Figure 19:
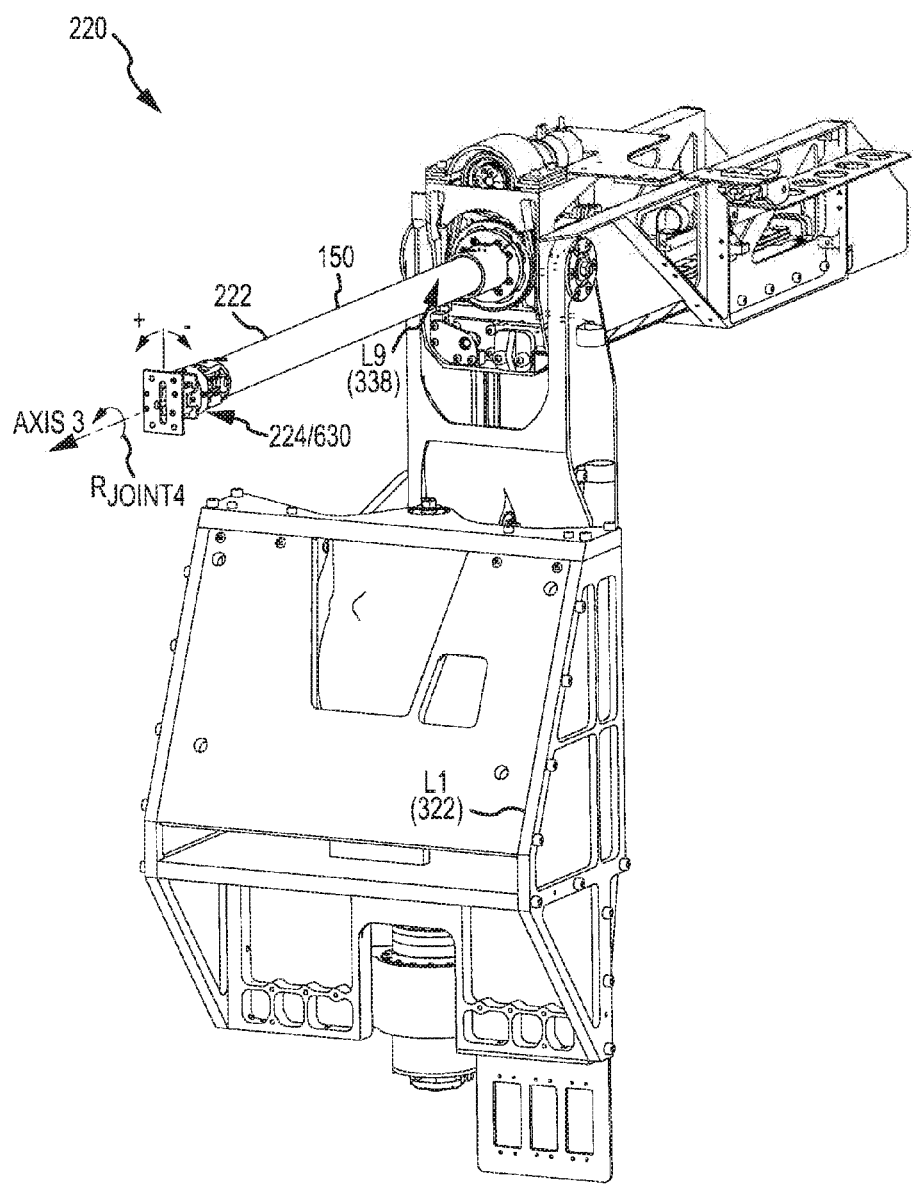

FIG. 19 provides a perspective view of the robotic mechanism 220 with the fourth joint or rod rotate joint (joint 624 of FIG. 6) being operated as shown with an arrow, $R_{Joint\ 4}$, to provide rotation about Axis 3. In other words, the rod 150 is rotated about its longitudinal axis (or Axis 3) in positive and/or negative directions. The rod rotate joint (or fourth joint 624) may be configured within mechanism 220 to have varying ranges of motion depending on particular applications (e.g., to suit needs of a mechanism 220 to manipulate a figure attached to the rod 150). For example, some applications may use the rod 150 of mechanism 220, 240, 260 to operate a right hand, a left hand, and a head of a figure, and, in such an application, the fourth joints of these three robotic mechanisms 220, 240, 260 may be adapted to rotate the rod 150 about Axis 3 through ranges of +120 to −60 degrees, +60 to −120 degrees, and +45 to −45 degrees, respectively.

Figure 20:
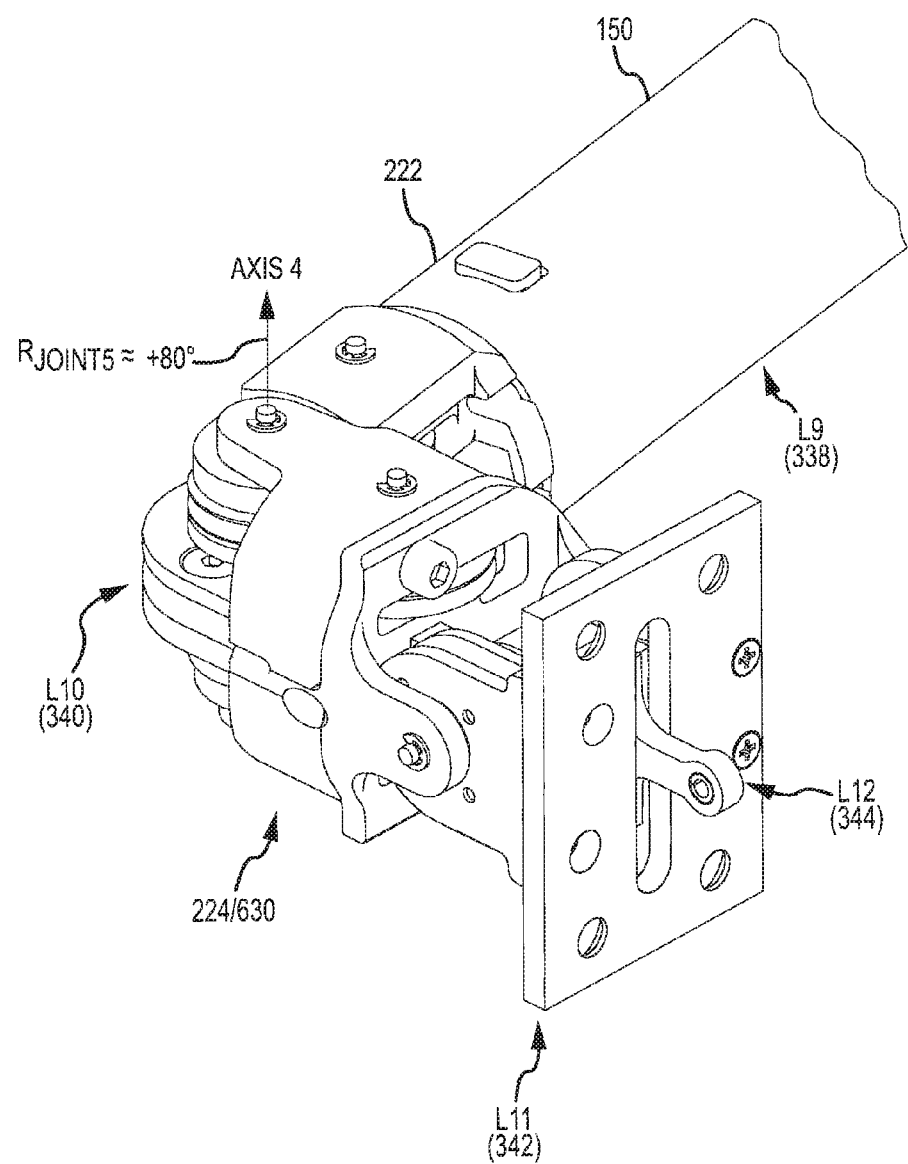
Figure 21:
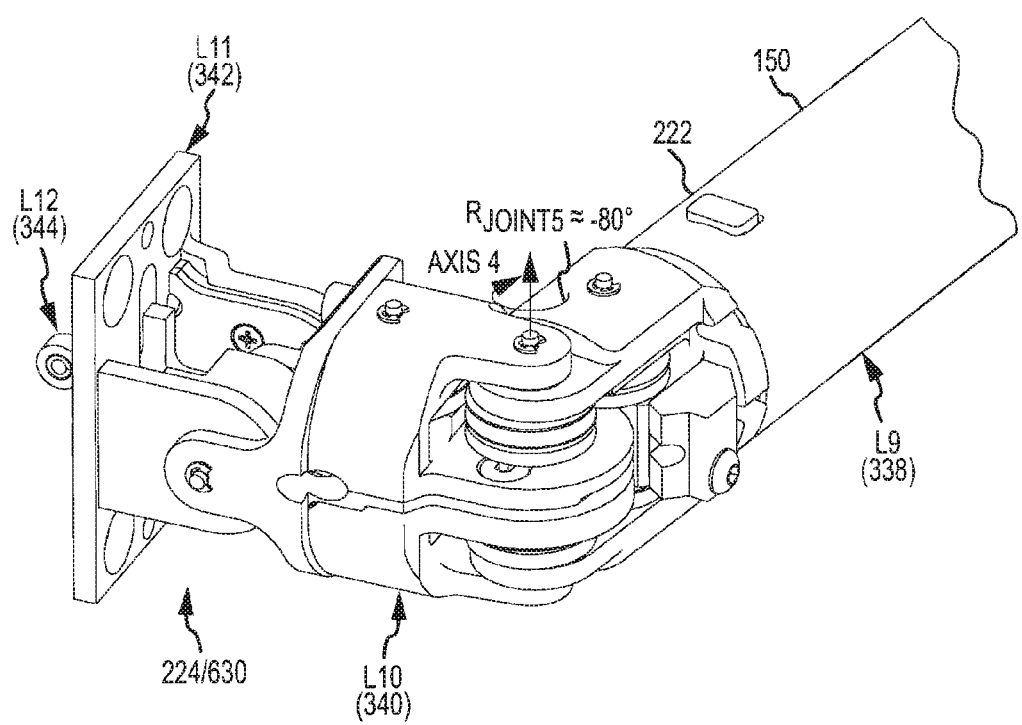
Figure 22:
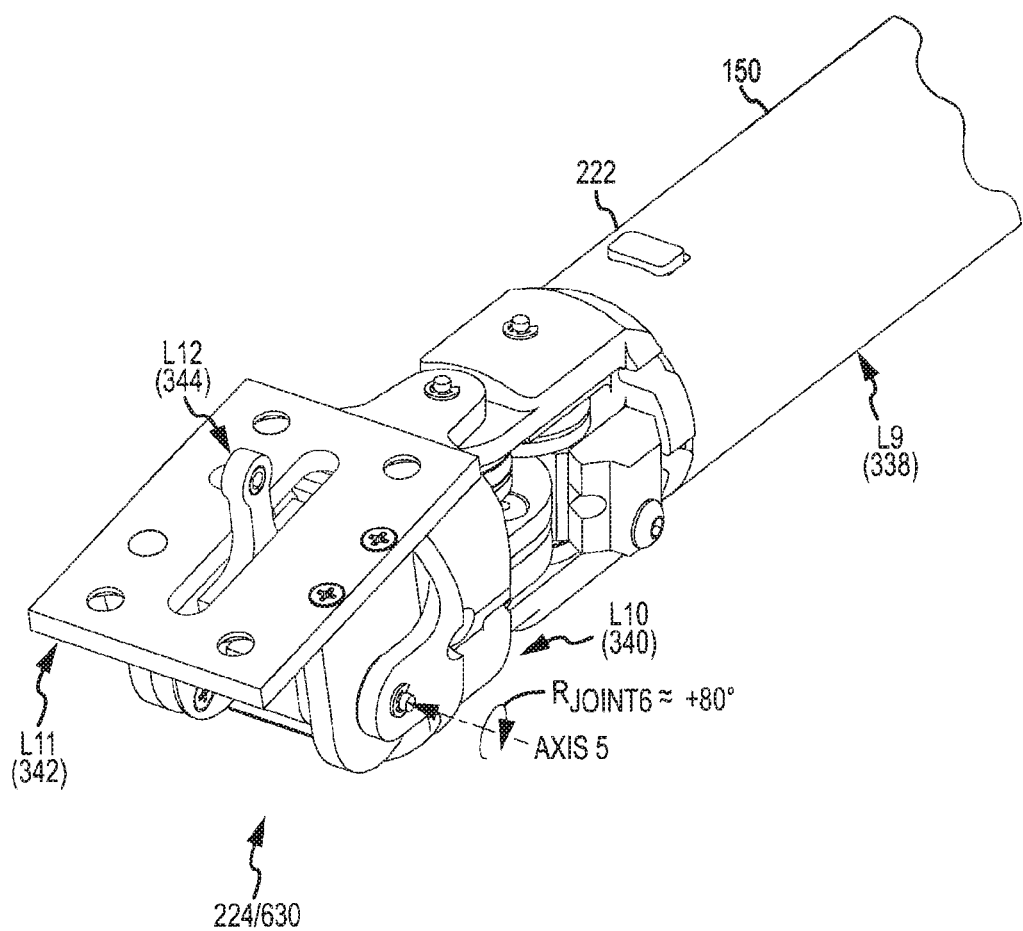
Figure 23:
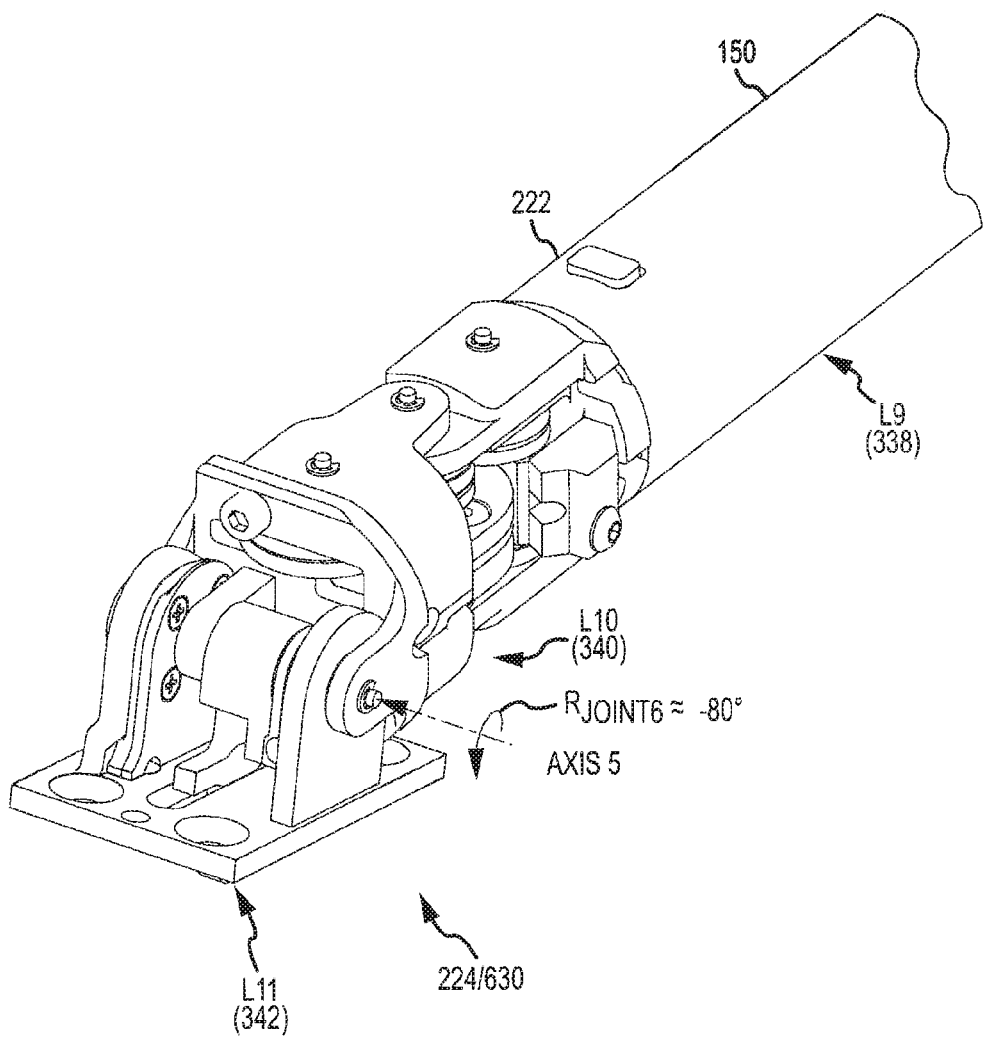
Figure 24:
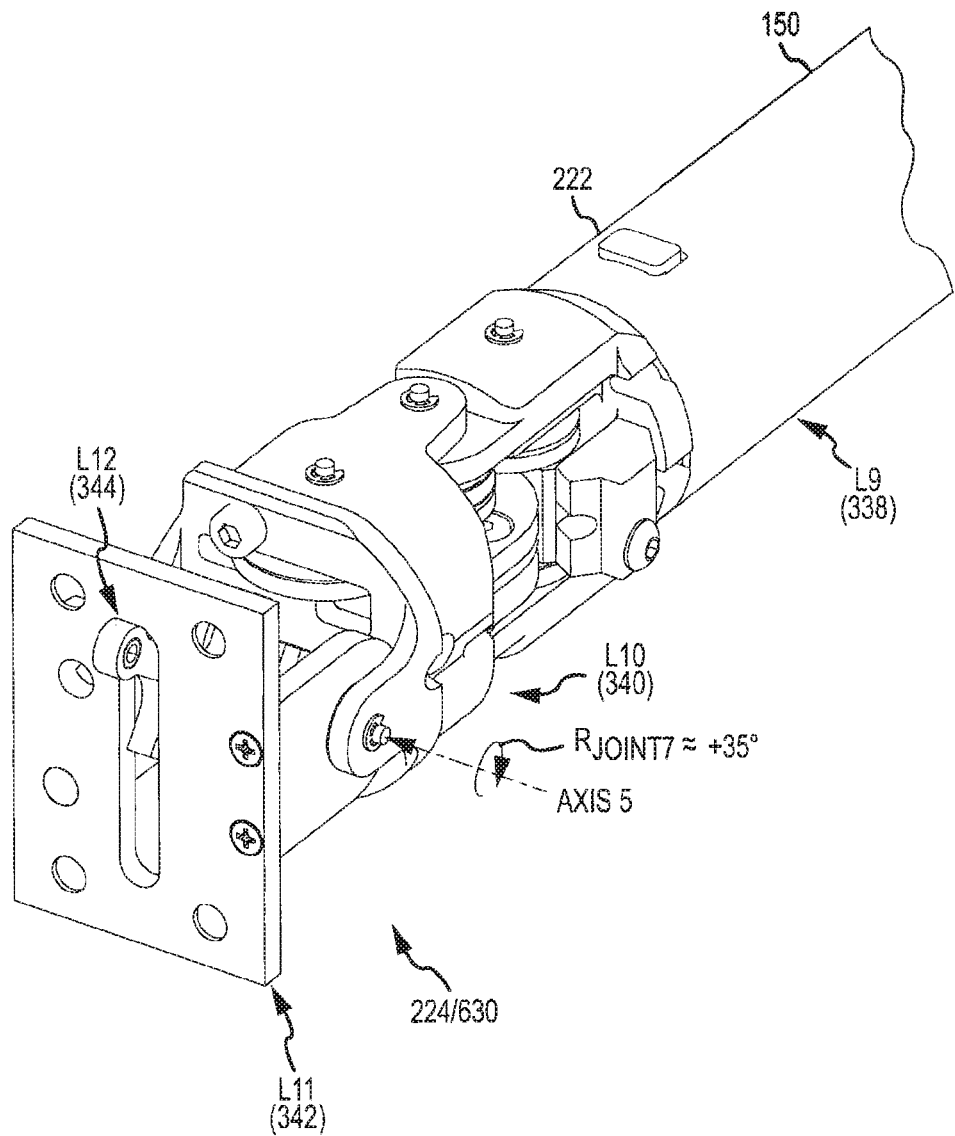
Figure 25:
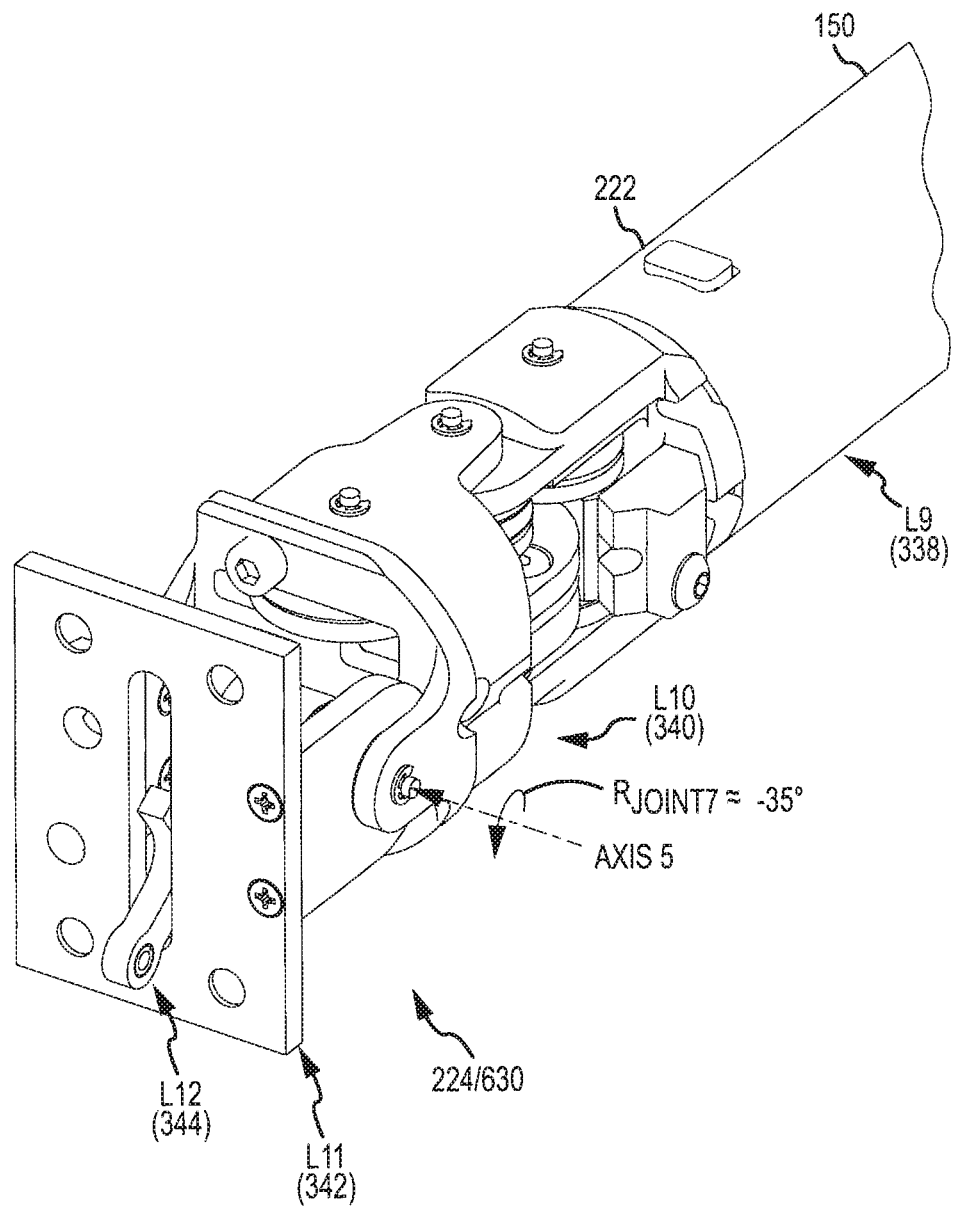

FIGS. 20 and 21 provide an enlarged view of the wrist 224, 630 showing rotation of the fifth joint or wrist yaw joint (joint 625 in FIG. 6) through its range of motion about Axis 4. For example, as shown, the wrist 224, 630 may be configured to provide a fifth joint or wrist yaw with rotation, $R_{Joint\ 5}$, ranging from +80 to −80 degrees about Axis 4. FIGS. 22 and 23 are an enlarged view of the wrist 224, 630 showing movement of the sixth joint or wrist pitch joint (joint 626 of FIG. 6) through its range of motion about Axis 5. For example, as shown, the wrist 224, 630 may be configured to provide a sixth joint or wrist pitch with rotation, $R_{Joint\ 6}$, ranging from +80 to −80 degrees about Axis 5. Further, FIGS. 24 and 25 are views of the wrist 224, 630 showing movement of the seventh joint or wrist jaw (joint 627 of FIG. 6) through its range of motion, $R_{Joint\ 7}$, such as +35 to −35 degrees about Axis 5.

Figure 26:
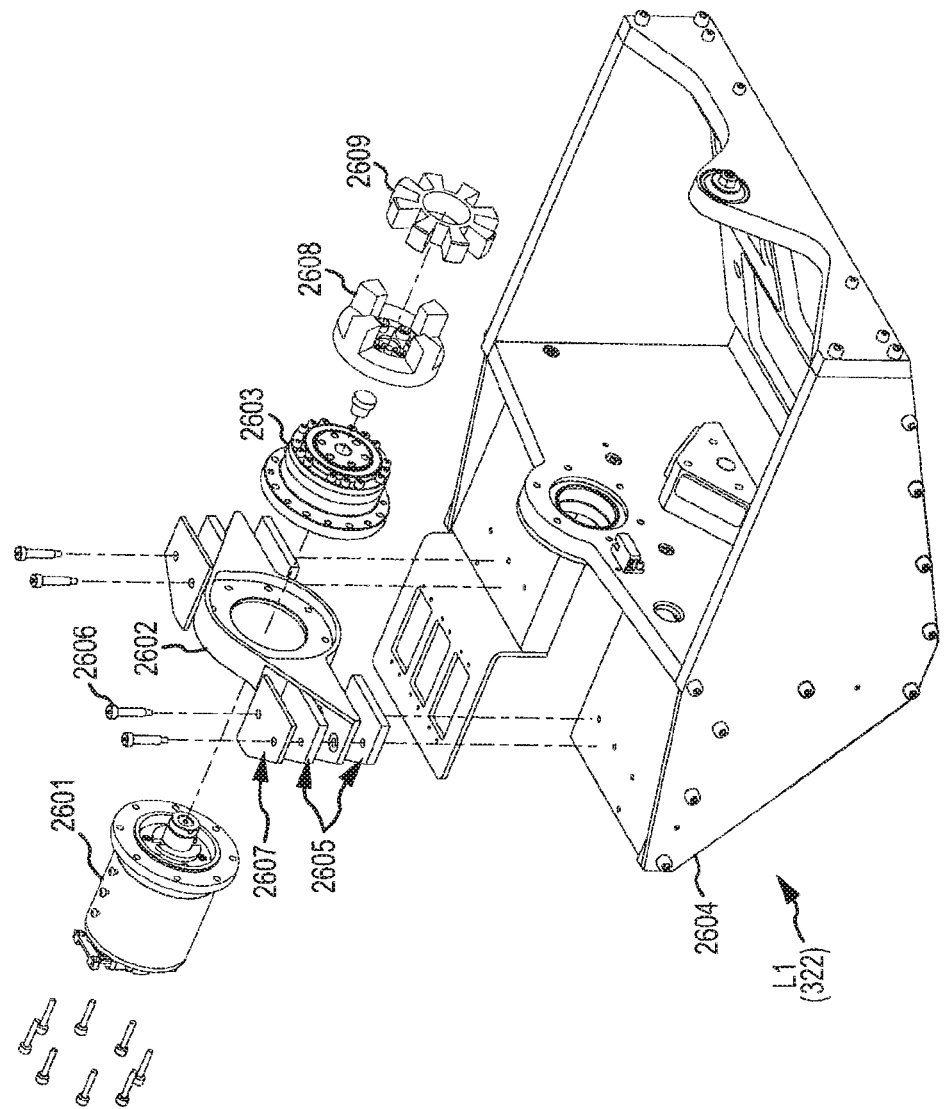
FIG. 26 provides an exploded view of the first link or based assembly of the robotic mechanism of FIG. 7 showing vibration isolation of a drive motor.

At this point, it may be useful to provide further description or detail of particular implementations of the various links and joints of an exemplary robotic mechanism (e.g., mechanism 220 which is representative of mechanisms 240 and 260). FIG. 26 shows an exploded view of the first link L1 (322) of the robotic mechanism 220 of FIG. 7. It is interesting to note that all the rotary motors in the mechanism 220 are isolated using polyurethane (or other similar materials) mountings and couplings. This reduces transmission of high frequency motor or gear vibration to the structure of the mechanism 220, which is desirable in many applications of animatronic figure displays as it significantly reduces audible noise.

Particularly, the first link L1 (322) is shown in FIG. 26 to include a brushless servo motor with an incremental encoder 2601 (e.g., a servo motor distributed by Emoteq Corporation or the like with an encoder such as provided by US Digital or the like) that is mounted to a mounting bracket 2602. Also mounted to the bracket 2602 is a gearbox 2603 (e.g., a gearbox from Harmonic Drive LLC or the like). The mounting bracket 2602 is, in turn, mounted to a base structure 2604, such as through pads 2605 (e.g., polyurethane pads or the like) using shoulder screws 2606 and mounting plates 2607 (e.g., aluminum plates or the like). Such mounting acts to isolate the motor 2601 and gearbox 2603 from the base structure 2604. Further, the first link L1 (322) may include a flexible coupling that uses a jaw 2608 to transmit torque through a spider 2609 (e.g., a spider formed from polyurethane or other material(s)). In the mechanism 220 of FIG. 7, a similar jaw may be rigidly fixed to the second link L2 (324) so as to further isolate the second link L2 (324) from high frequency vibration. This arrangement provides a drive train that transmits very little vibration to the robot structure, resulting in very little audible noise. Note, similar methods of mounting may be used on other (or even all) rotary axes of the robotic mechanism 220.

Figure 27:
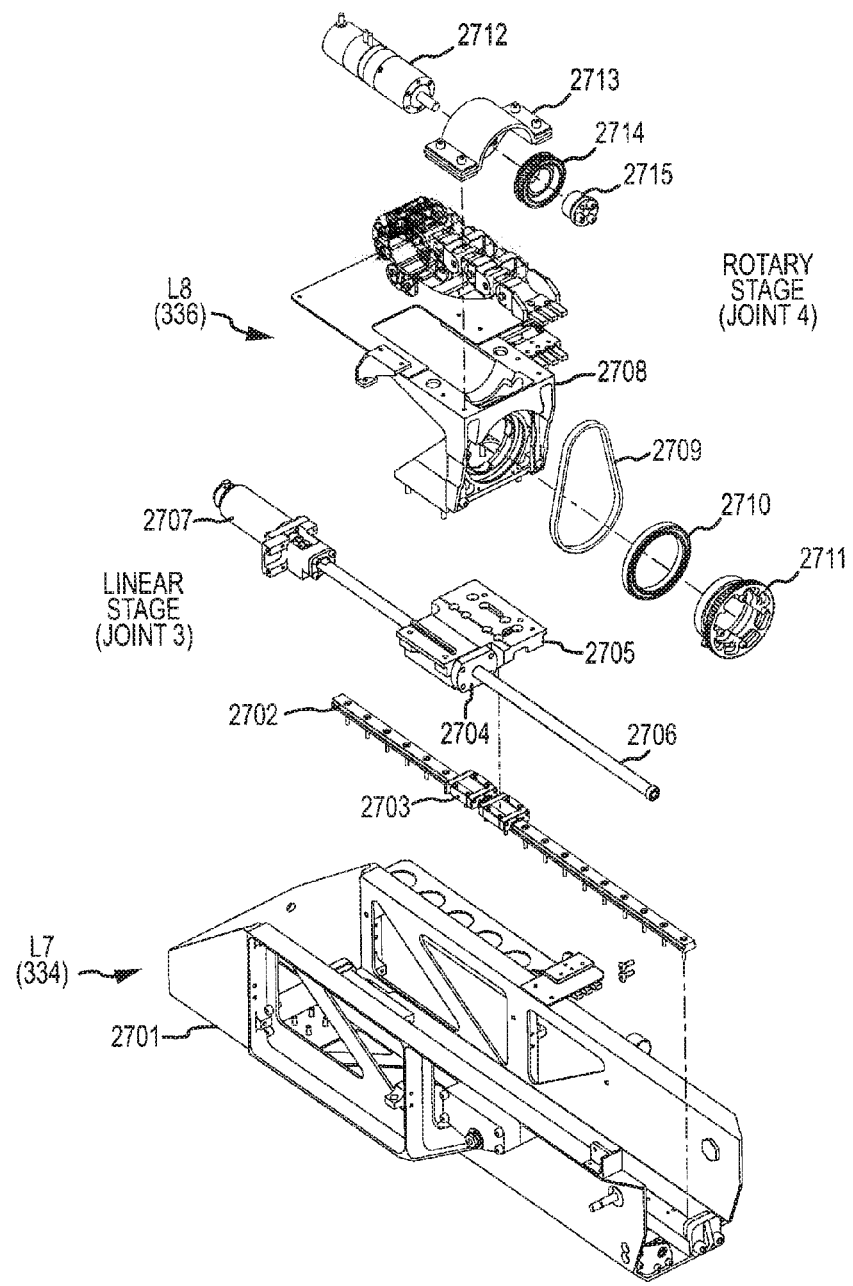
FIG. 27 illustrates an exploded view of a linear carriage or the seventh and eighth links (which provide the third and fourth joints) of the robotic mechanism of FIG. 7.

FIG. 27 illustrates a partially exploded view of the seventh and eighth links L7 and L8 (334 and 336), which provide the third and fourth joints (labeled Linear Stage (Joint 3) and Rotary Stage (Joint 4) in the figure). The third joint provides linear motion of the rod 150 (or the ninth link L9 (338)) shown in FIG. 7) along Axis 3. The linear motion is provided using a linear stage that includes carriage 2705 that is mounted on linear bearing pads 2703 to a linear rail 2702. The rail 2702 is, in turn, mounted to the structure 2701 (structure providing the seventh link L7 (334)). The linear carriage 2705 is driven by a ball-nut and ball-screw 2704, 2706 via servo motor 2707.

Attached to the linear carriage 2705 (and linear stage/Joint 3) is a rotary stage (Joint 4). This rotary stage includes an output pulley 2711 that is mounted via a four-point contact bearing 2710 to a support bracket 2708 (e.g., the eighth link L8 (336)). The bracket 2708 is rigidly fixed to the linear carriage 2705. The output pulley 2711 is driven by a toothed belt 2709 by a motor drive pulley 2714, which is attached via a coupling 2715 to a servo motor 2712 (e.g., a Harmonic Drive RSF-8B or the like). As is the case with all rotary axes in the robotic mechanism 220 (and mechanisms 240, 260), the motor/gearbox is isolated from the structure using an elastomeric isolation mount 2713. The mechanism rod and wrist (e.g., links L9-L12), not shown in FIG. 27, are rigidly mounted to the rotary stage (Joint 4) output pulley 2711.

Figure 28:
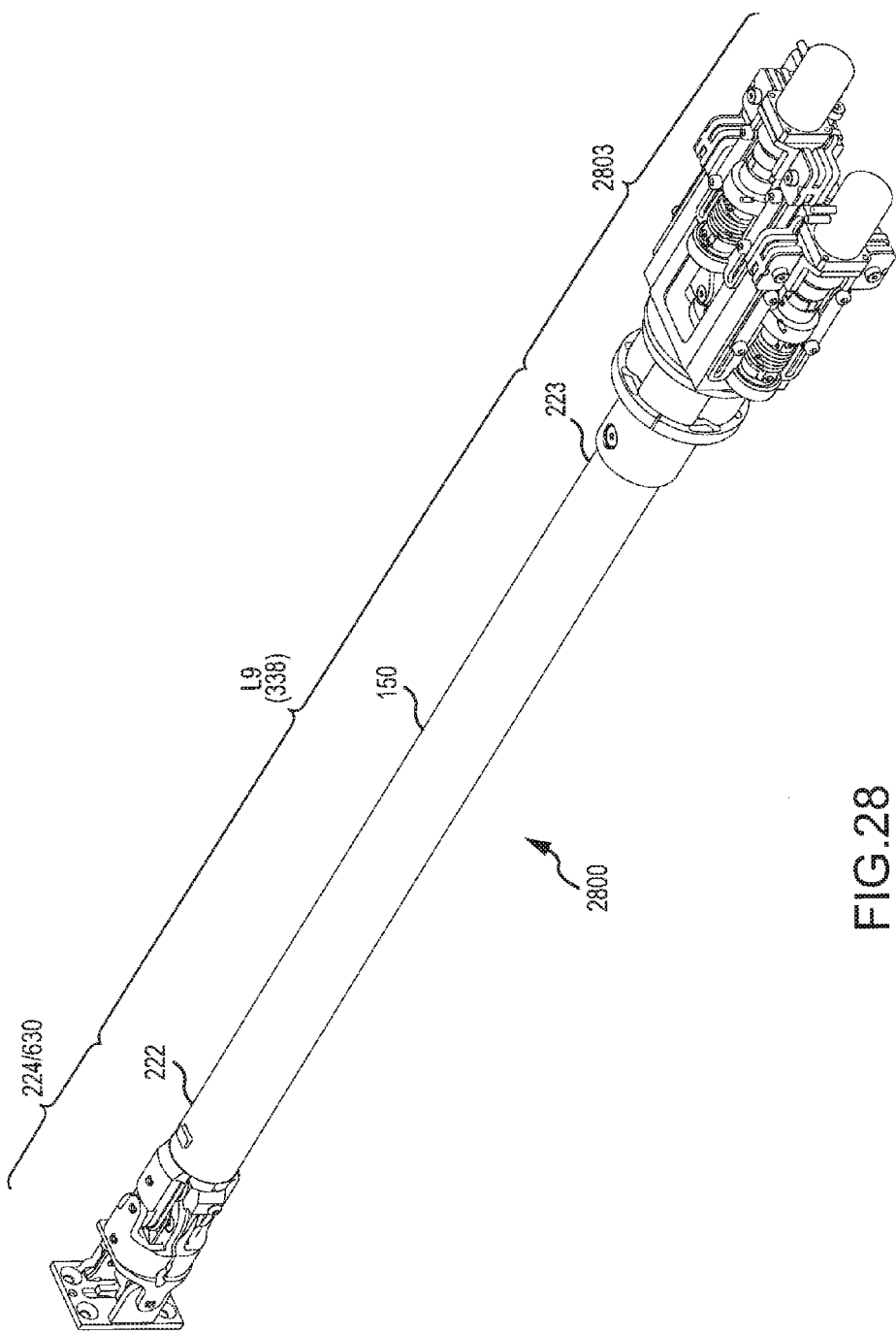
FIG. 28 illustrates a rod assembly provided as part of the robotic mechanism of FIG. 7.

FIG. 28 illustrates a rod assembly 2800 that may be used in the robotic mechanism 220 of FIG. 7 to provide the ninth through the twelfth links L9-12. The rod assembly 2800 includes three main components. First, the assembly 2800 includes a cable-drive wrist assembly 224, 630. Second, the assembly 2800 includes a structural tube assembly 150 (or the ninth link L9 (338)) with a first or distal end 222 to which the wrist assembly 224, 630 is attached and a second or proximate end 223 that is mounted to a cable drive assembly 2803 (i.e., the third main component). In the following description, an explanation is provided of how a set of cables (e.g., stainless steel aircraft cable or the like) can be used to operate the tenth, eleventh, and twelfth links L10, L11, and L12 of the wrist assembly 224, 630. Then, the discussion teaches how those cables, which pass through the rod 150 (which may have a tubular or hollow cylindrical body), are actuated by the cable drive assembly 2803.

Figure 29:
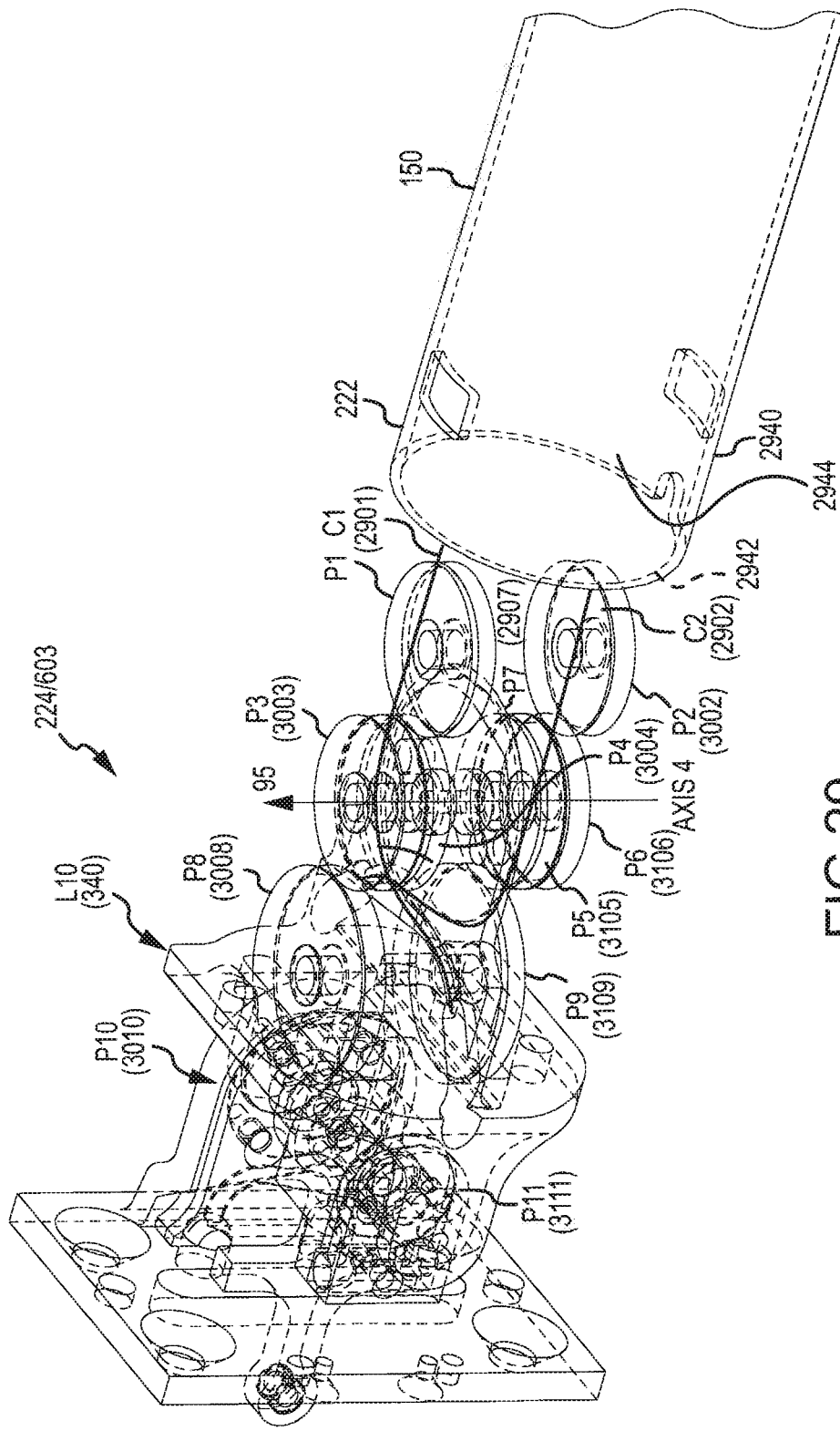
FIGS. 29-31 illustrate a pulley assembly and cable routing used in one embodiment to operate the wrist assembly of the robotic mechanism.

In FIG. 8, the wrist 224, 630 was shown to include three links (L10 (340), L11 (342), and L12 (344)). FIG. 29 shows how link L10 (340) is operated using two cables C1 (2901) and C2 (2902), each of which are wrapped around a pulley P7 (2907) and terminate on this pulley P7 (2907). The rod 150 is a tube with a cylindrical sidewall 2940 that has an opening 2942 exposing its inner surface or space 2944 through which cables including cables C1 (2901) and C2 (2902) are run from cable drive 2803. The pulley P7 (2907) may be machined into the structure of the tenth link L10 (340) so as to pivot about Axis 4.

Figure 30:
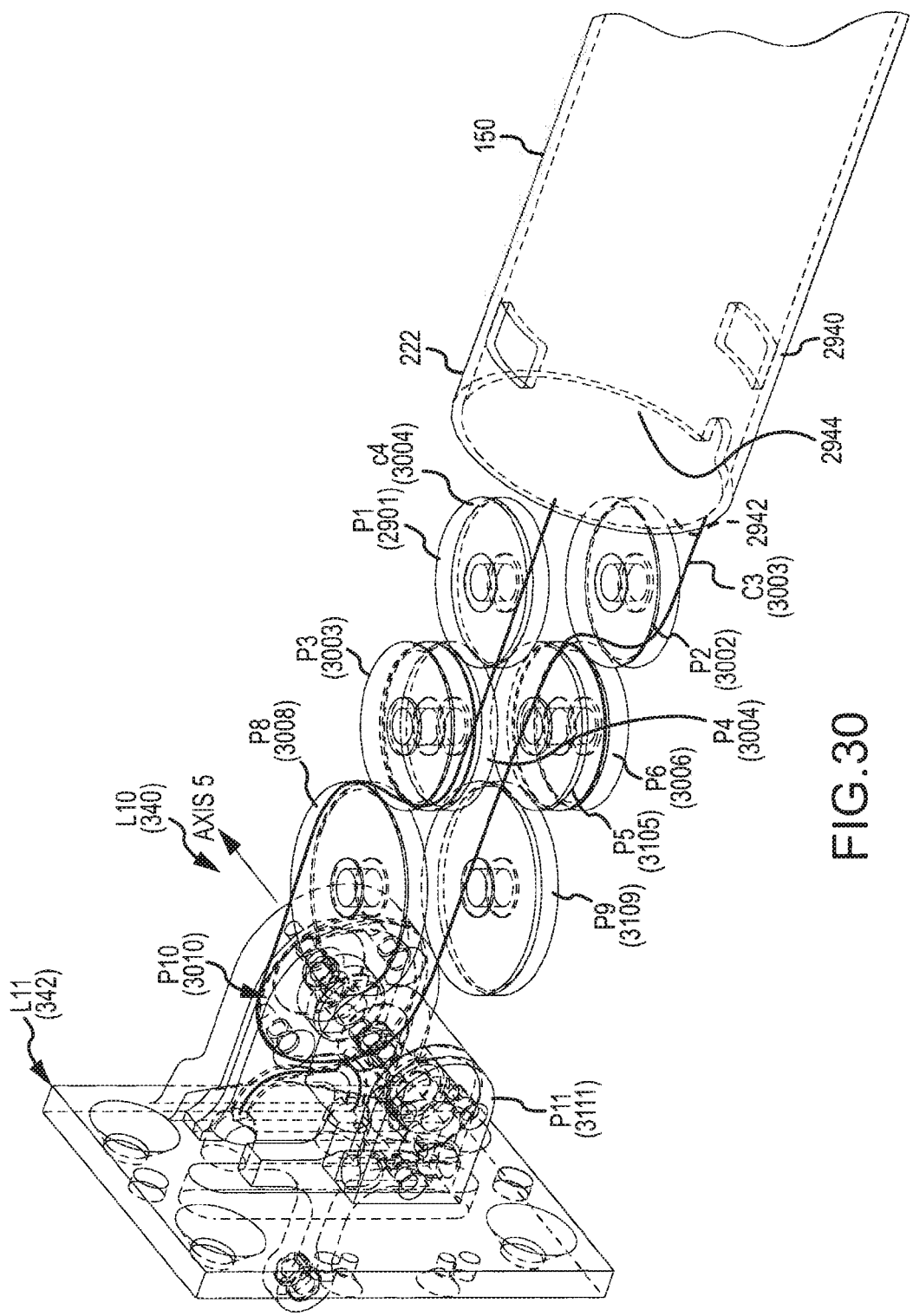

FIG. 30 shows another pair of cables C3 and C4 (3003 and 3004) operating the eleventh link L11 (342) by wrapping around and terminating on pulley P10 (3010). The pulley P10 (3010) may be machined into the structure of the eleventh link L11 (342). However, because pulley P10 (3010) operates on the distal side of Axis 4, the cables C3 and C4 (3003 and 3004) are routed over several idler pulleys in order to maintain a constant cable length in order to maintain tension during motion of the wrist 224/630. Cable segment C3 (3003) first passes over pulleys P2 (3002) and P6 (3006) before engaging driven pulley P10 (3010), and cable segment C4 (3004) first passes over pulleys P3 (3003) and P8 (3008) before engaging driven pulley P10 (3010).

Figure 31:
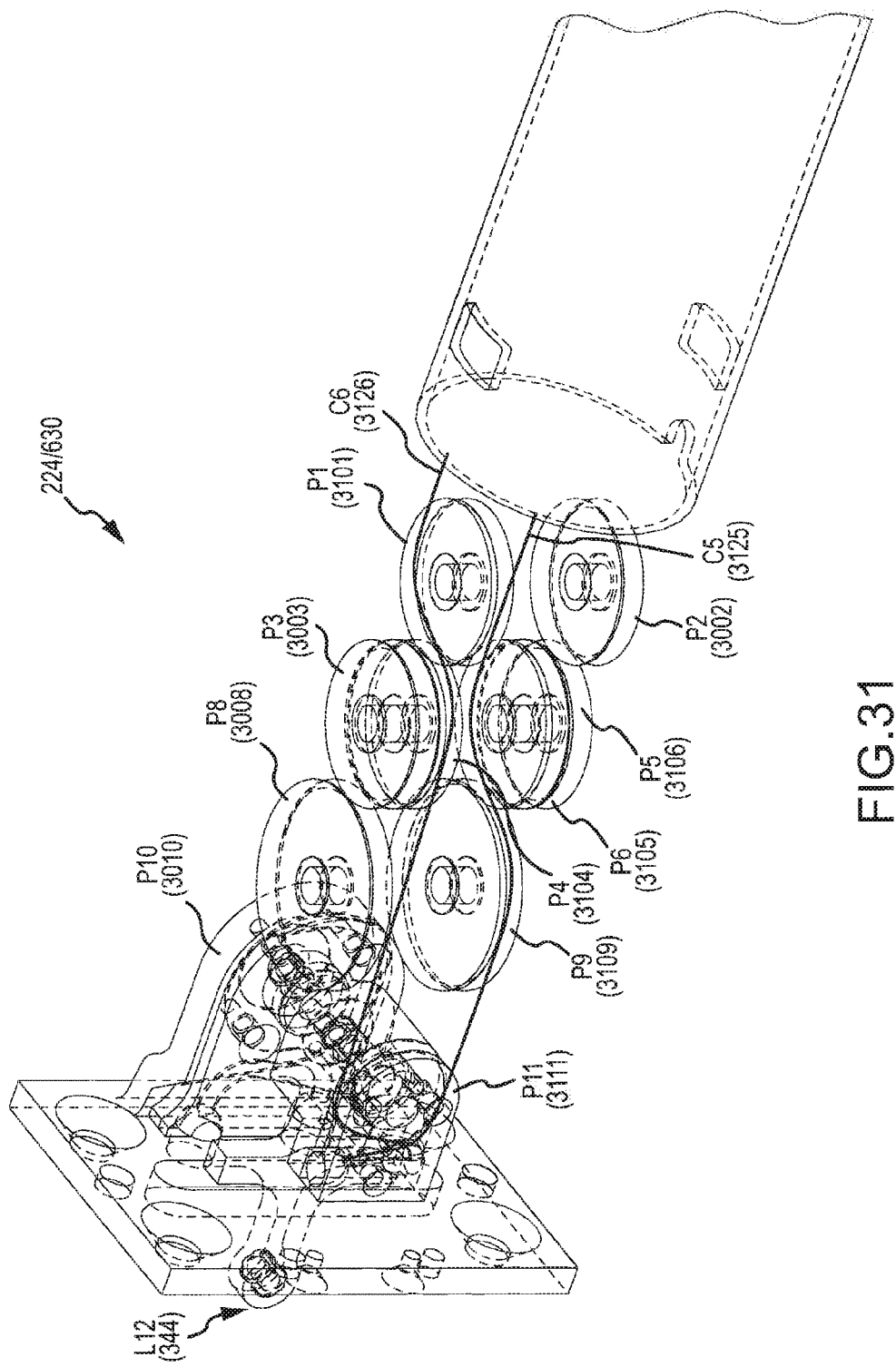

Similarly, as shown in FIG. 31, another pair of cable segments C5 and C6 (3125 and 3126) operates the twelfth link L12 (344). This is achieved by wrapping cables 3125, 3126 around and terminating on pulley P11 (3111). Cable segment C5 (3125) first passes over pulleys P5 (3105) and P9 (3109) before engaging driven pulley P11 (3111), and cable segment C6 (3126) first passes over pulleys P1 and P4 (3101 and 3104) before engaging driven pulley P11 (3111).

Figure 32:
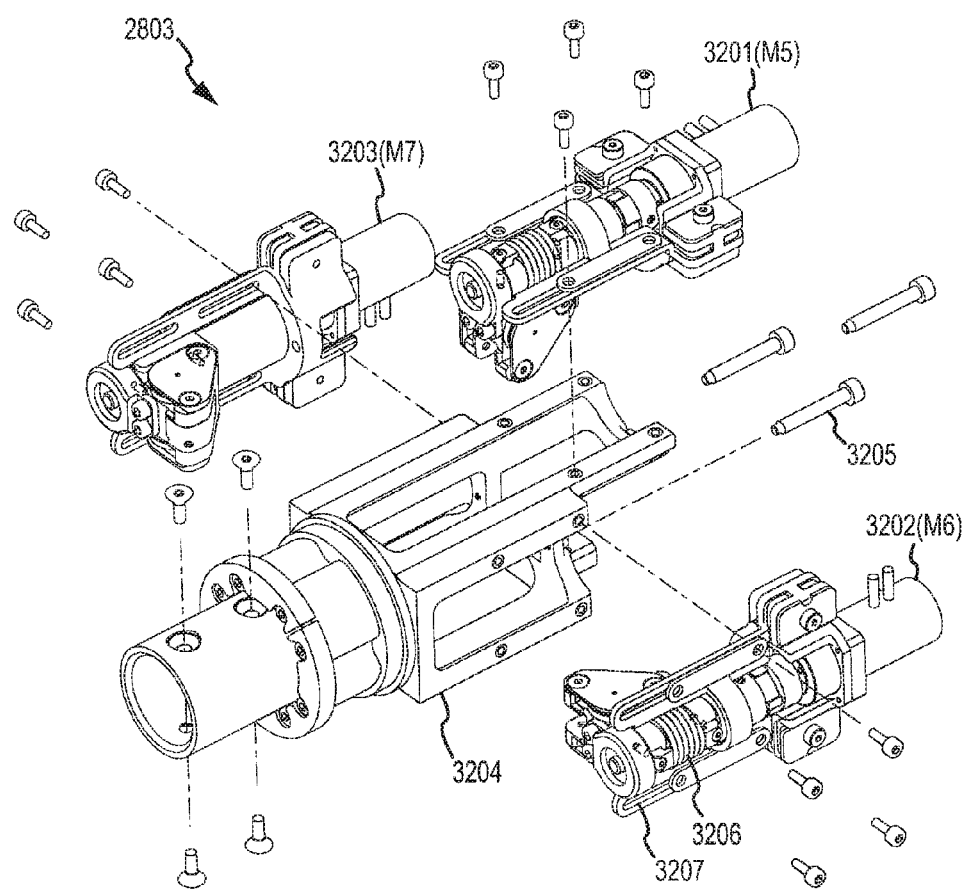
FIG. 32 provides an exploded view of a cable drive assembly of the robotic mechanism (e.g., of the rod assembly of FIG. 28)

FIG. 32 illustrates an exploded view of the cable drive assembly 2803 of FIG. 28. The cable drive assembly 2803 includes three motor drive assemblies 3201, 3202, and 3203 (also labeled $M_5$, $M_6$, and $M_7$ in FIG. 32). Each motor drive assembly 3201, 3202, 3203 engages and drives one pair of drive cables (shown in FIGS. 29-31) and is mounted to a motor drive chassis 3204. Each pair of drive cables terminates on a threaded drive capstan 3206 (as shown for assembly 3202) in order to effectively create a single cable loop per motor drive. By sliding the motor drive assembly 3201, 3202, 3203 (as shown for assembly 3202) rearward on slot 3207 using tensioning screws 3205, the cable tension can be adjusted and maintained. In the illustrated example with further reference to FIGS. 29-31, drive assembly 3201 ($M_5$) operates the tenth link L10 (340), drive assembly 3202 ($M_6$) operates the eleventh link L11 (342), and drive assembly 3203 ($M_7$) operates the twelfth link L12 (344).

Figure 33:
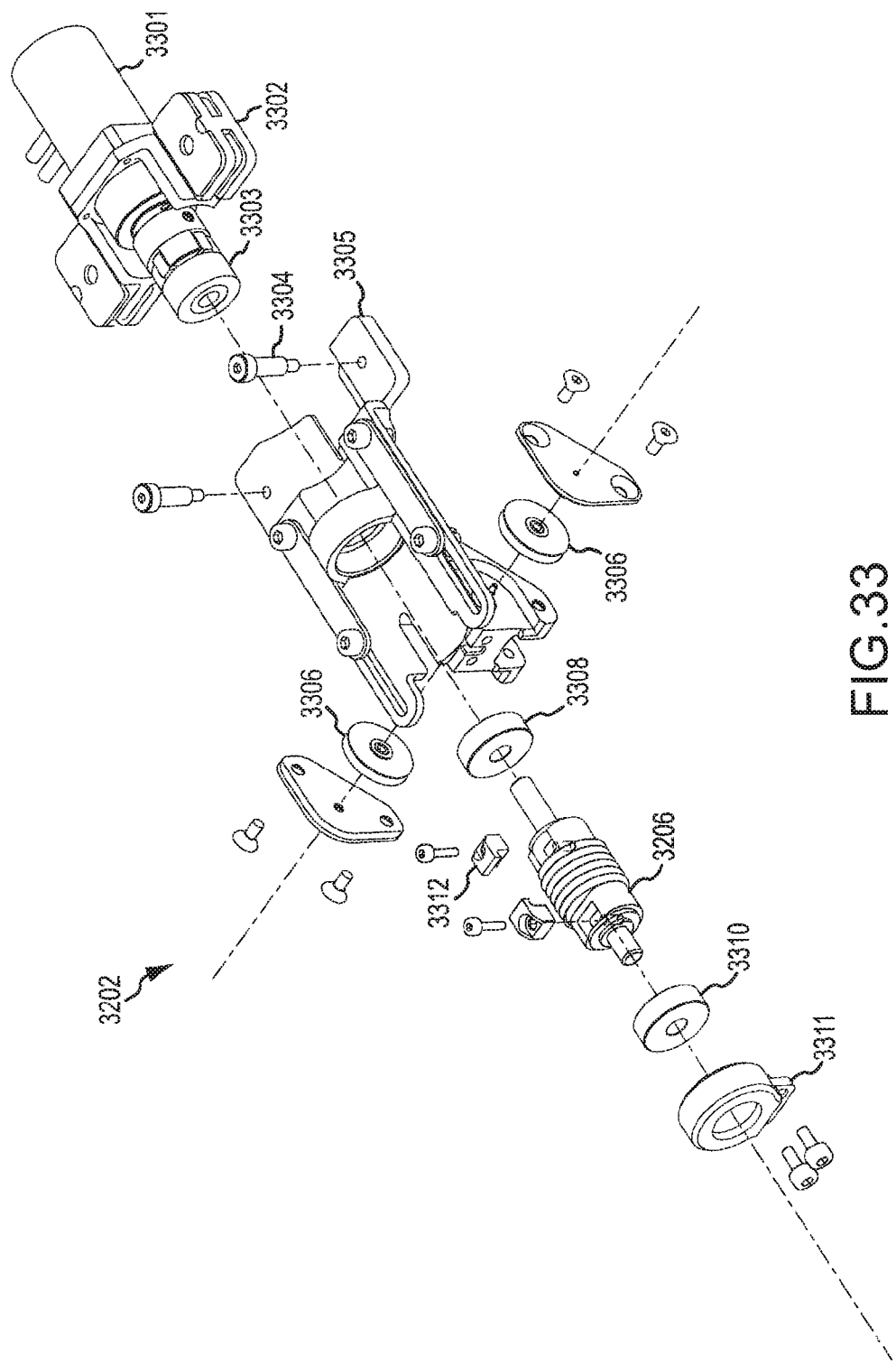
FIG. 33 is an exploded view of one of the motor drive assemblies of the cable drive assembly of FIG. 32.

FIG. 33 shows an exploded view of the motor drive assembly 3202 of FIG. 32, and similar arrangements exist for assemblies 3201, 3203 of the cable drive assembly 2803. The assembly 3202 includes a servo motor 3301 (e.g., a Harmonic Drive HSF-5A or the like) that is mounted, via an elastomeric vibration isolation mount 3302, to a cable drive chassis 3305 using screws or fasteners 3304. The motor 3301 drives a threaded capstan 3206 via a flexible coupling 3303. The capstan 3206 is mounted via rotation bearings 3308 and 3310 to the drive chassis 3305. The bearings 3308, 3310 are supported by the drive chassis 3305 and the bearing support 3311. The drive cable segments (not shown in FIG. 33) terminate on the capstan 3206 via cable clamps 3312. Each cable segment passes over idler pulleys 3306 to be redirected such that they travel down the inside of the structural tube that supports both the wrist and the cable drive assembly 2803, terminating on the wrist.

The above described arrangement of pulleys and cables driving the wrist results in a mapping between motor motion and the motion of the joints shown in FIG. 6. In order to describe this mapping, it may be useful to assign values to the effective pitch radius of several pulleys shown in FIGS. 29-31 as well as for the threaded capstans 3206 of FIG. 33. Specifically, the following relationships may be assigned (or defined): R1=radius of motor capstan for links L10 and L11; R2=radius of motor capstan for link L12; R3=radius of pulley P7; R4=radius of pulleys P3 and P6; R5=radius of pulleys P4 and P5; R6=radius of pulley P10; and R7=radius of pulley P11. Then, if Joints 5, 6, and 7 (of FIG. 6) are assigned velocities of q5_dot, q6_dot, and q7_dot, respectively, and the outputs of the cable drive servo motors are assigned velocities m5_dot, m6_dot, and m7_dot, respectively (where positive directions are CCW when looking into the output shaft of the servo motor), the following relationship exists:

$$\begin{pmatrix} R3/R1 & 0 & 0 \\ -R4/R1 & -R6/R1 & 0 \\ R5/R1 & R7/R2 & R7/R2 \end{pmatrix} * \begin{pmatrix} \dot{q}_5\_dot \\ \dot{q}_6\_dot \\ \dot{q}_7\_dot \end{pmatrix} = \begin{pmatrix} m5\_dot \\ m6\_dot \\ m7\_dot \end{pmatrix}$$

Note that the units of velocity simply need to be equal for the joints and motors (e.g., radians/second, degrees/second, or the like). Also, it should be understood that the above relationship provides a 3×3 matrix while the second two items are column vectors (3×1).

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. As described, animatronic figure systems are provided that use one or more robotic mechanisms to rotate a rod (or rigid tube through which cables are fed) about a fixed rotation point (i.e., a remote center (RC) point or remote center of rotation) that is remote and not interfering with any other portions of the robotic mechanism.

In many embodiments, a 3-axis wrist is mounted on the distal end of this driven/rotated rod. Combined with the rod motion, each robotic mechanism is then able to provide the part of the animatronic figure that is attached to the wrist (such as a hand or a head) with six independent motions (i.e., three translations and three rotations). A final pivot provided by the wrist allows further actuation of the attached part of the figure such as actuation of a jaw when the part is a head or actuation of a hand gripper when the part is a hand of the animatronic figure. Note, in the description, the wrist is sometimes described as a 2-axis wrist and sometimes as a 3-axis wrist. In this regard, Joint 4 (or stick rotate) may be considered one of the wrist joints. Some embodiments of the wrist, though, may only include a pivot such as for "hands" such that with the addition of the stick-rotate joint such a wrist is a 2-axis wrist.

We claim:

1. An apparatus for displaying an animatronic figure, comprising:
    a figure with a body attached at one end to a platform and including a movable component spaced apart from the attached end; and
    a drive assembly including a robotic drive mechanism driving a rod attached at a distal end to the movable component of the figure such that the figure is externally actuated when the rod is selectively moved by the robotic drive mechanism, wherein the robotic drive mechanism further comprises a wrist mounted at the distal end of the rod and attached to the movable component of the figure, the wrist having at least two degrees of freedom selectively driven by the robotic drive mechanism and
    wherein the robotic drive mechanism is a remote center mechanism that rotates the rod about a center of rotation that is offset a distance from the movable component.

2. The apparatus of claim 1, wherein the wrist comprises a cable driven wrist mounted at the distal end of the rod, the wrist being actuated via cables extending through a hollow chamber of the rod and the wrist being a 3-axis wrist providing at least two joints including a rotation movement of the movable component.

3. The apparatus of claim 2, wherein the wrist further provides a third joint actuating a gripper or a jaw mechanism of the movable component.

4. The apparatus of claim 1, wherein the center of rotation is a remote center of rotation for the robotic drive mechanism.

5. The apparatus of claim 1, wherein the robotic drive mechanism is positioned in a space behind a wall and the rod extends through the wall to the distal end and wherein the remote center of rotation for the robotic drive mechanism coincides with the hole in the wall.

6. The apparatus of claim 1, wherein the robotic drive mechanism includes at least six joints providing three translations and three rotations to drive the movable component with at least six degree of freedom.

7. The apparatus of claim 1, wherein the figure further includes second and third movable components flexibly attached to the body, wherein the drive assembly further includes second and third drive mechanisms that each include a rod extending to distal ends attached to the second and third movable components, and wherein the drive assembly further includes a controller providing computer-based control over the robotic drive mechanisms to synchronize movement of the movable components via selective movement of the rods.

8. The apparatus of claim 1, wherein the body is flexible or articulated so as to move with the movable component.

9. A system for externally actuating an animatronic figure with first and second driven parts attached to a body, comprising:
a first robotic mechanism configured as a remote center mechanism for selectively rotating a first rod about a first remote center point, the first rod being attached at an end distal to the first robotic mechanism to the first driven part of the animatronic figure and the first remote center point being spaced apart from the body of the animatronic figure;
a second robotic mechanism configured as a remote center mechanism for selectively rotating a second rod about a second remote center point, the second rod being attached at an end distal to the second robotic mechanism to the second driven part of the animatronic figure and the second remote center point being spaced apart from the body of the animatronic figure; and
a back drop screen positioned between the first and second robotic mechanisms and the animatronic figure, wherein the first and second rods extend through the screen such that first and second remote points substantially coincide with the screen.

10. The system of claim 9, further comprising a third robotic mechanism configured as a remote center mechanism for selectively rotating a third rod about a third remote center point, the third rod being attached at an end distal to the third robotic mechanism to the third driven part of the animatronic figure and the third remote center point being spaced apart from the body of the animatronic figure.

11. The system of claim 9, wherein the first and second robotic mechanisms are each configured to provide at least six joints to provide at least six DOF movement of the first and second driven parts of the body of the figure.

12. The system of claim 9, further comprising a 3-axis, cable-driven wrist provided at the distal end of at least one of the first and second rods, the 3-axis wrist being configured to provide at least a rotation of a joint.

13. The system of claim 11, wherein the 3-axis wrist provides a third joint operable to provide a seventh DOF movement of the driven part.

14. The system of claim 9, further comprising a controller with a processor controlling concurrent operation of the first, second, and third robotic mechanism and running one or more display programs to synchronize the concurrent operations to coordinate movement of the first, second, and third driven parts of the body.

15. An externally actuated animatronic figure, comprising:
a robotic drive assembly including first and second robotic drive mechanisms each including a rigid rod;
a body and first and second driven components flexibly attached to the body, wherein ends of the rods are attached to the first and second driven components; and
a controller selectively operating the first and second robotic drive mechanisms to externally actuate movement of the first and second driven components, wherein the first and second robotic drive mechanisms each further comprises a 3-axis wrist mounted at the end of the rod providing an attachment point to the first or second driven component and
wherein each of the robotic drive mechanisms is a remote center mechanism that rotates a corresponding one of the rods about a center of rotation that is spaced apart a distance from the first and second driven components.

16. The animatronic figure of claim 14, wherein each of the rods rotates about the center of rotation located spaced apart from the first and second robotic drive mechanisms.

17. The animatronic figure of claim 16, further comprising a back drop between the first and second robotic drive mechanisms and the body and wherein the remote centers of rotation substantially coincide with locations at which the rods pass through the back drop.

18. The animatronic figure of claim 16, wherein each of the 3-axis wrists is configured to provide full translation and full rotation of the corresponding driven component.

19. The animatronic figure of claim 18, wherein at least one of the 3-axis wrists includes an additional joint operable by the robotic drive mechanism to actuate a gripping mechanism or jaw function of the corresponding driven component.

20. An apparatus for displaying an animatronic figure, comprising:
a figure with a body attached at one end to a platform and including a movable component spaced apart from the attached end; and
a drive assembly including a robotic drive mechanism driving a rod attached at a distal end to the movable component of the figure such that the figure is externally actuated when the rod is selectively moved by the robotic drive mechanism,
wherein the robotic drive mechanism further comprises a wrist mounted at the distal end of the rod and attached to the movable component of the figure, the wrist having at least two degrees of freedom selectively driven by the robotic drive mechanism,
wherein the robotic drive mechanism is positioned in a space behind a wall and the rod extends through the wall to the distal end, and
wherein the remote center of rotation for the robotic drive mechanism coincides with the hole in the wall.

21. The apparatus of claim 20, wherein the wrist comprises a cable driven wrist mounted at the distal end of the rod, the wrist being actuated via cables extending through a hollow chamber of the rod and the wrist being a 3-axis wrist providing at least two joints including a rotation movement of the movable component.

22. The apparatus of claim 21, wherein the wrist further provides a third joint actuating a gripper or a jaw mechanism of the movable component.

23. The apparatus of claim 20, wherein the robotic drive mechanism is a remote center mechanism that rotates the rod about a center of rotation that is offset a distance from the movable component and wherein the center of rotation is a remote center of rotation for the robotic drive mechanism.

24. The apparatus of claim 20, wherein the robotic drive mechanism includes at least six joints providing three translations and three rotations to drive the movable component with at least six degree of freedom.

25. The apparatus of claim 20, wherein the figure further includes second and third movable components flexibly attached to the body, wherein the drive assembly further includes second and third drive mechanisms that each include a rod extending to distal ends attached to the second and third movable components, and wherein the drive assembly further includes a controller providing computer-based control over the robotic drive mechanisms to synchronize movement of the movable components via selective movement of the rods.

26. The apparatus of claim 20, wherein the body is flexible or articulated so as to move with the movable component.

* * * * *

UNITED STATES PATENT AND TRADEMARK OFFICE
CERTIFICATE OF CORRECTION

PATENT NO.        : 8,761,927 B2
APPLICATION NO.   : 12/971995
DATED             : June 24, 2014
INVENTOR(S)       : Steven A. Johnson et al.

Page 1 of 1

It is certified that error appears in the above-identified patent and that said Letters Patent is hereby corrected as shown below:

In the Specification

Column 4, line 4, delete "faun" and insert therefor --form--.

Column 5, line 59, delete "foam" and insert therefor --forms--.

Signed and Sealed this
Second Day of September, 2014

Michelle K. Lee
*Deputy Director of the United States Patent and Trademark Office*